US010114790B2

(12) United States Patent
Hanchinal et al.

(10) Patent No.: US 10,114,790 B2
(45) Date of Patent: Oct. 30, 2018

(54) PORT MIRRORING FOR PERIPHERAL COMPONENT INTERCONNECT EXPRESS DEVICES

(71) Applicant: MICROSEMI STORAGE SOLUTIONS (U.S.), INC., Aliso Viejo, CA (US)

(72) Inventors: Kiran Hanchinal, Bangalore (IN); Kuan Hua Tan, Coquitlam (CA); Richard David Sodke, Burnaby (CA); Gregory Arthur Tabor, Colorado Springs, CO (US)

(73) Assignee: Microsemi Solutions (U.S.), Inc., Aliso Viejo, CA (US)

( * ) Notice: Subject to any disclaimer, the term of this patent is extended or adjusted under 35 U.S.C. 154(b) by 183 days.

(21) Appl. No.: 15/231,605

(22) Filed: Aug. 8, 2016

(65) Prior Publication Data
US 2017/0337152 A1 Nov. 23, 2017

(30) Foreign Application Priority Data

May 17, 2016 (IN) .............................. 201641017076

(51) Int. Cl.
*G06F 13/42* (2006.01)
*G06F 13/40* (2006.01)
(52) U.S. Cl.
CPC ...... *G06F 13/4282* (2013.01); *G06F 13/4022* (2013.01)

(58) Field of Classification Search
None
See application file for complete search history.

(56) References Cited

U.S. PATENT DOCUMENTS

| 7,209,476 | B1 | 4/2007 | Colloff et al. |
| 8,874,833 | B1* | 10/2014 | Gole ................... G06F 12/0246 711/103 |
| 9,432,298 | B1* | 8/2016 | Smith ................ H04L 49/9057 |
| 2013/0007483 | A1* | 1/2013 | Diefenbaugh ........ G06F 1/3206 713/320 |
| 2013/0311817 | A1* | 11/2013 | Kim .......................... G06F 1/04 713/501 |
| 2014/0089541 | A1* | 3/2014 | Tresidder ................ G06F 13/42 710/105 |
| 2014/0126612 | A1 | 5/2014 | Tresidder et al. |

(Continued)

Primary Examiner — Henry Tsai
Assistant Examiner — Christopher A Bartels
(74) Attorney, Agent, or Firm — Leber IP Law; Dennis R. Haszko

(57) ABSTRACT

An apparatus and method for port mirroring in a plurality of Peripheral Component Interconnect express (PCIe) interfaces includes, for each PCIe interface, output transmission ports for transmitting data to a central processing unit (CPU), receiving input ports for receiving data from the CPU, port-mirror-in (PM_IN) ports, and port-mirror-out (PM_OUT) ports provided in a PHY layer instance. The PM_OUT ports of each PHY layer instance is coupled to the PM_IN ports of a next PHY layer instance such that the PHY layer instances of the plurality of PCIe interfaces are connected in a ring bus architecture for mirroring one or more ports of the output transmission ports or the receiving input ports of a first active PHY layer instance can be mirrored to output transmission ports of a second PHY layer instance.

22 Claims, 12 Drawing Sheets

(56) References Cited

U.S. PATENT DOCUMENTS

| | | | | |
|---|---|---|---|---|
| 2014/0189427 A1* | 7/2014 | Jayaprakash Bharadwaj | ............. | G06F 11/1415 |
| | | | | 714/15 |
| 2014/0198790 A1* | 7/2014 | Christenson | ........ | H04L 43/0811 |
| | | | | 370/392 |
| 2014/0359044 A1* | 12/2014 | Davis | ...................... | H04L 45/60 |
| | | | | 709/213 |
| 2015/0180782 A1* | 6/2015 | Rimmer | ................. | H04L 69/22 |
| | | | | 370/236 |
| 2015/0261709 A1* | 9/2015 | Billi | ................... | G06F 13/4022 |
| | | | | 710/316 |
| 2016/0378545 A1* | 12/2016 | Ho | ........................... | G06F 9/50 |
| | | | | 718/107 |
| 2017/0091108 A1* | 3/2017 | Arellano | ............. | G06F 12/0888 |
| 2017/0206166 A1* | 7/2017 | Kumar | ............... | G06F 12/0888 |

\* cited by examiner

PORT MIRRORING FOR PERIPHERAL COMPONENT INTERCONNECT EXPRESS DEVICES

FIELD

The present disclosure relates to port mirroring for Peripheral Component Interconnect express interfaces.

BACKGROUND

Peripheral Component Interconnect express (PCIe) is a serial bus standard for connecting a computer to one or more peripheral devices. PCIe utilizes a layered protocol having a transaction layer, a data link layer, and a physical (PHY) layer. The data link layer includes a media access control (MAC) layer. The PHY layer connects the MAC layer and a physical medium, such as an optical cable or a copper cable for communication between the MAC layer and external physical devices. The MAC layer is responsible for moving data packets to and from one Network Interface Card (NIC) in a computer to another across a shared channel.

In some instances, it may be desirable to monitor data packets flowing through a PCIe device that is actively communicating with the NIC. However, the data packets cannot be directly monitored in prior art PCIe devices without interrupting communication with the NIC. Improvements to PCIe devices are desired.

SUMMARY

The present disclosure provides an apparatus and method for port mirroring in a plurality of PCIe interface.

According to an aspect of the present disclosure, there is a provided an apparatus for port mirroring that includes a plurality of peripheral component interconnect express (PCIe) interfaces, each PCIe interface including, in a physical (PHY) layer instance of the PCIe interface, output transmission ports for transmitting data to a central processing unit (CPU), receiving input ports for receiving data from the CPU, port-mirror-in (PM_IN) ports, and port-mirror-out (PM_OUT) ports, wherein the PM_OUT ports of each PHY layer instance is coupled to the PM_IN ports of a next PHY layer instance such that the PHY layer instances of the plurality of PCIe interfaces are connected in a ring bus architecture for mirroring one or more ports of either the output transmission ports or the receiving input ports of a first active PHY layer instance to output transmission ports of a second inactive PHY layer instance.

According to another aspect, each PHY layer instance further includes a transmission multiplexer having a first input connected to the PM_IN ports of the PHY layer instance, a second input connected to PCIe architecture (PIPE) transmission ports that receive data from a MAC layer instance associated with the PHY layer instance, and an output connected to the transmission output of the PHY layer instance, wherein the transmission multiplexer is configured to connect the transmission output to the first input in a port mirror mode and to the second input in an active mode.

According to another aspect, each PHY layer instance further includes an elastic buffer between the PM_IN ports and the first input of the input multiplexer for performing clock compensation in the mirror mode when the active PHY layer instance and the inactive PHY layer instance each include a separate clock generator.

According to another aspect, each PHY layer instance further includes a port mirror multiplexer having first input ports connected to PIPE transmission ports that receive data from a MAC layer instance associated with the PHY layer instance, second input ports connected to the receiving input ports, third input ports connected to the PM_IN ports, and output ports connected to the PM_OUT ports of the PHY layer instance, wherein the port mirror multiplexer is configured to connect the output ports to one or more of the first input ports and the second input ports in a port mirror mode, and to connect the output ports to the third input ports in an inactive mode.

According to another aspect, the port mirror multiplexer is configured such that a first portion of the output ports correspond to a first set of ports of one of the first input ports, the second input ports and the third input ports, and a second portion of the output ports corresponding to a second set of ports of a different one of the first input ports, the second input ports and the third input ports.

According to another aspect, the port mirror multiplexer further includes a set of first multiplexer instances, each first multiplexer instance having input ports connected to the PM_IN ports and having a first output port for outputting one of the PM_IN ports, a set of second multiplexer instances, each second multiplexer instance having input ports connected to PCIe architecture (PIPE) transmission ports and having a second output port for outputting one of the PIPE transmission ports, a set of third multiplexer instances, each third multiplexer instance having input ports connected to the receiving input ports and having a third output port for outputting one of the receiving input ports, a set of fourth multiplexer instances, each fourth multiplexer instance having input ports coupled to the first outlet port of a corresponding one of the first multiplexer instances, the second outlet port of a corresponding one of the second multiplexer instances, and the third outlet port of a corresponding one of the third multiplexer instances and having a fourth outlet port corresponding to a respective one or more PM_OUT ports, wherein the first portion of the outlet ports of the port mirror multiplexer corresponds to a first set of the fourth multiplexer instances and the second portion of outlet ports of the port mirror multiplexer corresponds to a second set of the fourth multiplexer instances.

According to another aspect, the output transmission ports of the inactive PHY layer interface include a first portion of output transmission ports that mirrors one or more ports of a first active PHY layer instance, and a second portion of output transmission ports that mirrors one or more ports of a second active PHY layer instance that is different from the first active PHY layer instance.

According to another aspect, each of the PHY layer instances is configured such that debugging information received from the CPU at the input receive ports is output at the PM_OUT ports such that the debugging information of the active PHY instance is mirrored at the inactive PHY instance.

According to another aspect, a speed rate of the inactive PHY layer instance is determined based on a speed rate of the active PHY layer instance.

According to another aspect, analog settings of the inactive PHY layer instance are determined based on the analog settings of the active PHY instance. According to another aspect, that apparatus further includes a switch core matrix connected to each of the plurality of PCIe interfaces to route data between MAC layer instances of the plurality of PCIe interfaces, the switch core matrix separate from the in the ring bus architecture connecting the plurality of PHY layer instances.

According to another aspect of the present disclosure, there is provided a method that includes configuring a plurality of peripheral component interconnect express (PCIe) interfaces in a ring bus architecture by coupling port-mirror-in (PM_IN) ports of a PHY layer instance of each of the PCIe interfaces to port-mirror-out (PM_OUT) ports of a next PHY layer instance, at a first active PHY layer instance of the plurality of PCIe interfaces, outputting one or more ports of either output transmission ports of the active PHY layer instance for transmitting data to a central processing unit (CPU) and receiving input ports of the active PHY layer instance for receiving data from the CPU to the PM_OUT ports of the active PHY layer instance, and at a second inactive PHY layer instance, outputting the PM_IN ports of the inactive PHY layer instance to output transmission ports to mirror the one or more ports of the active PHY layer instance.

According to another aspect, each PHY layer instance further includes a transmission multiplexer having a first input connected to the PM_IN ports, a second input connected to PCIe architecture (PIPE) transmission ports for receiving data from a MAC layer instance associated with the PHY layer instance, and an output connected to output transmission ports of the PHY layer instance, the method further including switching the input multiplexer to connect the output transmission ports to the first input in a port mirror mode and to connect the output transmission ports to the second input in an active mode.

According to another aspect, the method further including, when the PHY layer instance is in a port mirror mode, performing clock compensation between the PM_IN ports and the first input of the transmission multiplexer when the active PHY layer instance and the inactive PHY layer instance each include a separate clock generator.

According to another aspect, each PHY layer instance further includes a port mirror multiplexer having first input ports connected to PCIe architecture (PIPE) transmission ports that receive data from a MAC layer instance associated with the PHY layer instance, second input ports connected to receiving input ports for receiving data from a central processing unit (CPU), third input ports connected to the PM_IN ports, and output ports connected to the PM_OUT ports of the PHY layer instance, the method further including switching the port mirror multiplexer to connect the output ports to one or more of the first input ports and the second input ports in a port mirror mode, and the third input ports in an inactive mode.

According to another aspect, switching the port mirror multiplexer includes switching the port mirror multiplexer such that a first portion of the output ports corresponds to a first set of ports of one of the first input ports, the second input ports and the third input ports, and a second portion of the output ports corresponds to a second set of ports of a different one of the first input ports, the second input ports, and the third input ports.

According to another aspect, the port mirror multiplexer further includes a set of first multiplexer instances, each first multiplexer instance having input ports connected to the PM_IN ports and having a first output port for outputting one of the PM_IN ports, a set of second multiplexer instances, each second multiplexer instance having input ports connected to the PIPE transmission ports and having a second output port for outputting one of the PIPE transmission ports, a set of third multiplexer instances, each third multiplexer instance having input ports connected to the receiving input ports and having a third output port for outputting one of receiving input ports, a set of fourth multiplexer instances, each fourth multiplexer instance having input ports coupled to the first outlet port of a corresponding one of the first multiplexer instances, the second outlet port of a corresponding one of the second multiplexer instances, and the third outlet of a corresponding one of the third multiplexer instances and having a fourth outlet corresponding to a respective one or more PM_OUT ports, wherein switching the port mirror multiplexer comprises utilizing the fourth outlet ports of a first set of the fourth multiplexer instances as the first portion of the output ports of the port mirror multiplexer, and utilizing the fourth outlet ports of a second set of the fourth multiplexer instances as the second portion of the outlet ports of the port mirror multiplexer.

According to another aspect, each PHY layer includes output transmission ports that are utilized to mirror the ports of the active PHY layer instance, the method further comprising configuring the output transmission ports of the inactive PHY layer to include a first portion of output transmission ports that mirror one or more ports of a first active PHY layer instance, and a second portion of output transmission ports that mirror one or more ports of a second active PHY layer instance that is different from the first active PHY layer instance.

According to another aspect, the method further includes configuring each of the PHY layer instances to transmit debugging information received from the CPU at the PM_OUT ports such that the debugging information of the active PHY instance may be mirrored at the inactive PHY instance.

According to another aspect, the method further includes determining a speed rate of the inactive PHY layer instance based on a speed rate of the active PHY layer instance.

According to another aspect, the method further includes determining analog settings of the PHY layer instance of the inactive PHY layer instance are based on analog settings of the active PHY layer instance.

According to another aspect, configuring the configuring the plurality PCIe interfaces in a ring bus architecture comprises connecting the PM_OUT ports of the PHY layer instance to the PM_IN ports of the next PHY layer instance separate from a switching core matrix that connects to each of the plurality of PCIe interfaces to route data between MAC layer instances of the plurality of PCIe interfaces.

BRIEF DESCRIPTION OF THE DRAWINGS

The following detailed description references the drawings, wherein.

DETAILED DESCRIPTION

Peripheral Component Interconnect express (PCIe) has numerous improvements compared to older standards, such as peripheral component interconnect (PCI), peripheral component interconnect extended (PCI-X), and accelerated graphics port (AGP). The improvements include a higher throughput, lower input/output pin count, and a more detailed error detection and reporting mechanism. PCIe utilizes a protocol having a transaction layer, a data link layer, and a physical (PHY) layer. The data link layer includes a media access control (MAC) layer. A standard for an interface between the PHY layer and the MAC layer is given by PHY Interface for the PCI Express Architecture (PIPE) published by Intel Corporation.

Figure 1:
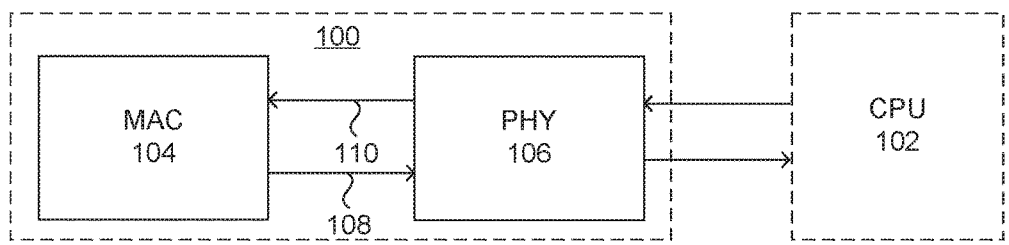
FIG. 1 is a schematic representation of a PCIe interface illustrating communication between the PCIe interface and a Central Processing Unit (CPU) according to the prior art.

FIG. 1 is a schematic representation of a prior art PCIe interface 100 that may be utilized to facilitate communication with a central processing unit (CPU) 102 of a computer. The PCIe interface 100 includes a MAC layer 104 and a PHY layer 106. The PCIe interface 100 may also be connected to a peripheral device (not shown) to facilitate communication between the peripheral device and the CPU.

The PHY layer 106 include PIPE transmit (PIPE_Tx) ports 108 for receiving data packets from the MAC layer 104 which are to be transmitted to the CPU 102 via communication cabling (not shown) and PIPE receive (PIPE_Rx) ports 110 for sending data packets, received from the CPU 102 via the communication cabling, to the MAC layer 104. Any number of PIPE_Tx ports 108 and PIPE_Rx ports 110 may be include in the PHY layer 106.

Figure 2:
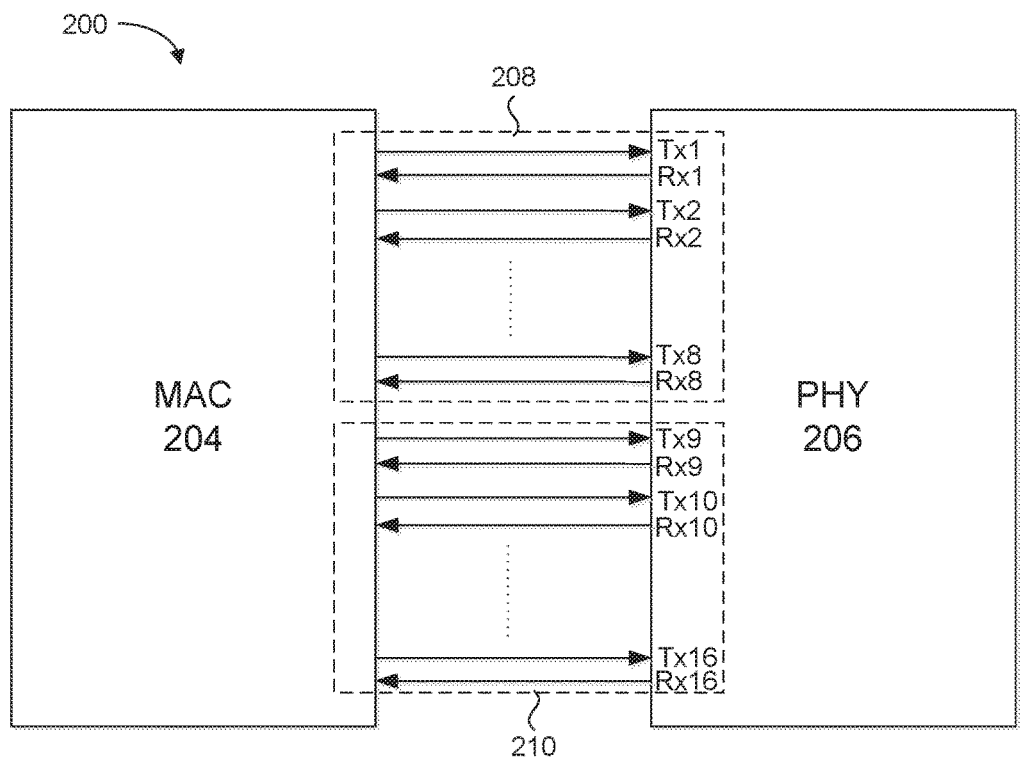
FIG. 2 is a schematic representation of the connections between MAC layer and PHY layer as two cores each having eight transmit (Tx) ports and eight Receive (Rx) ports according to the prior art.

FIG. 2 shows in a schematic representation of a prior art PCIe interface 200 in which a PHY layer 206 includes sixteen PIPE_Tx ports and sixteen PIPE_Rx ports connected to the MAC layer 204. The sixteen PIPE_Tx and PIPE_Rx ports of the example PCIe interface 200 are separated into two cores. A first core 208 includes eight PIPE_Tx ports, Tx1-Tx8, and eight PIPE_Rx ports, Rx1-Rx8. Similarly, a second core 210 includes the other eight PIPE_Tx ports, Tx9-Tx16, and the other eight PIPE_Rx ports, Rx9-Rx16 such that the total number of PIPE_Tx and PIPE_Rx ports is sixteen.

The division of the ports in the PCIe device 200 for configuring the number of cores is known as port bifurcation. In other words, port bifurcation refers to configuring a fixed number of connections between the MAC layer and the PHY layer, called "lanes", into a configurable number of cores. Port bifurcation enables multiple simultaneous lanes of connections to exist between the MAC layer and the PHY layer.

In other examples, the connection between the PHY layer 206 and the MAC layer 204 can be configured as a single core that includes all the sixteen PIPE_Tx ports and sixteen PIPE_Rx ports. Similarly, the PIPE_Tx and PIPE_Rx ports may be configured as four cores, each having four PIPE_Tx and PIPE_Rx ports, or eight cores, each having two PIPE_Tx and PIPE_Rx ports, or sixteen cores, each having one PIPE_Tx and PIPE_Rx port.

Figure 3:
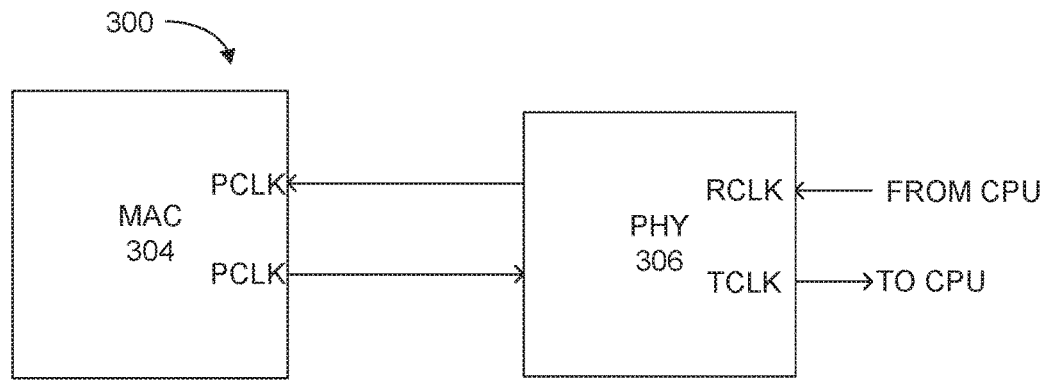
FIG. 3 is a schematic representation of a PCIe interface with various sets of clock signals that control timing of data flow into, and out of the PHY layer and the MAC layer according to the prior art.

The MAC layer and the PHY layer of a PCIe interface have sets of clock signals that control timing of data flow into, and out of, the layers. FIG. 3 is a schematic representation illustrating various sets of clock signals in a PCIe device 300. A transmit clock (TCLK) is a set of clock signals which determines when data is written by the PHY layer 306 to the CPU. Similarly, a receive clock (RCLK) is a set of clock signals which determines when data sent by the CPU is read by the PHY layer 306. A PIPE interface clock (PCLK) is a set of clock signals which determines when data is written by the MAC layer 304 to the PHY layer 306 and when data from the PHY layer 306 is read by the MAC layer 304.

Clock generators (not shown) that generate the TCLK, RCLK, and PCLK clock signals may have an inherent inaccuracy that causes the actual frequency of the clock signals to be slightly different from a rated frequency of the clock signals. Differences in the actual frequency of a clock signal from the rated frequency is measured in parts per million (PPM). The PPM variation of a clock signal can be defined as number of clock signals skewed per million clock signals. For example, when a set of clock signals having a frequency of 500 MHz is said to have a PPM variation of 300, one clock signal is skewed once in every 3333 clock signals, on average. A time period corresponding to a PPM variation N is given by:

$$N \times t_{clock}/10^6;$$

where $t_{clock}$ is time period of the set of clock signals.

Thus, in the example of a 300 PPM variation for a set of clock signals having a frequency of 500 MHz, the time period is 0.6 picoseconds. The PPM variation of the set of clock signals may follow a sinusoidal variation. Thus, the time period of the 500 MHz set of clock signals oscillates from 2 ns+0.6 ps to 2 ns−0.6 ps. In other words, the frequency of the 500 MHz set of clock signals oscillates from 499.85 MHz to 500.15 MHz.

The TCLK, the RCLK, and the PCLK of the PCIe interface 300 may have a common set of reference clock signals generated by a single clock generator (not shown) or different sets of reference clock signals generated by different clock generators (not shown).

When two sets of clock signals have a common set of reference clock signals, the PPM variations of the two sets of clock signals are synchronous, which results in a zero PPM variation between the two sets of clock signals. A scheme in which two sets of clock signals have a common set of reference clock signals is hereinafter referred to as common clocking scheme.

When the two sets of clock signals have different sets of reference clock signals the PPM variations of the two clock signals are asynchronous, which results in PPM variations existing between the two clock signals. A scheme in which two sets of clock signals have different sets of reference clock signals is hereinafter referred to as asynchronous clocking scheme.

Figure 4:
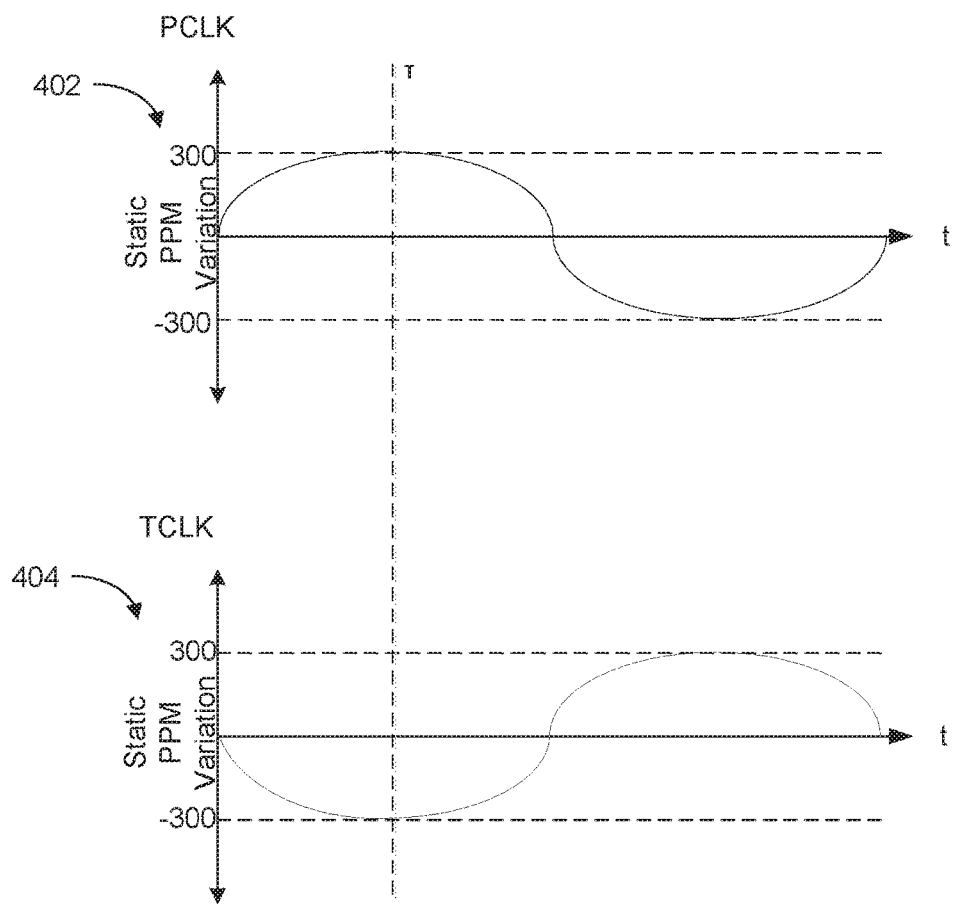
FIG. 4 is a graph of the parts per million (PPM) variations of transmit clock (TCLK), which controls timing of data flow from the PHY layer to the CPU, and PHY Interface for the PCIe Architecture (PIPE) clock (PCLK), which controls timing of data flow between the PHY layer and the MAC layer, having different sets of reference clock signals when they are out of phase with each other.

FIG. 4 shows a graph 402 of an example PPM variation of a PCLK relative to its associated reference clock, and a graph 404 of an example PPM variation of a TCLK relative to its associated reference clock. In the example shown in FIG. 4, the PCLK and the TCLK have different reference clock signals.

In the example shown in FIG. 4, the PPM variations of the PCLK and TCLK are out of phase such that, at a time instance t=T, the PPM variation between the two sets of clock signals is at its maximum. At the time instance t=T, PPM variation of the PCLK is +300 PPM and the PPM variation of the TCLK is −300 PPM, and therefore, the PPM variation between the two sets of clock signals is 600 PPM. The PPM variation between sets of clock signals due to the inherent inaccuracy of clock generators generating the sets of clock signals is hereinafter referred to as static PPM variation. The maximum and minimum permissible values of static PPM variations of a set of clock signals as per PCIe specification are +300 PPM and −300 PPM, respectively.

In addition to the static PPM variation between the sets of clock signals having different sets of reference clock signals, additional PPM variation is introduced due to modulation of the frequency of the clock signals. The modulation of the frequency of the clock signals is called spread spectrum clocking (SSC) and is performed to reduce electromagnetic interference generated by the clock signals. The set of clock signals undergoing SSC are hereinafter referred to as SSC clock signals. The maximum permissible value of PPM variation of the SSC clock signals due to SSC as per the PCIe specification is +0/−5000 PPM. The PPM variation between two sets of SSC clock signals due to SSC is hereinafter referred to as SSC PPM.

Figure 5:
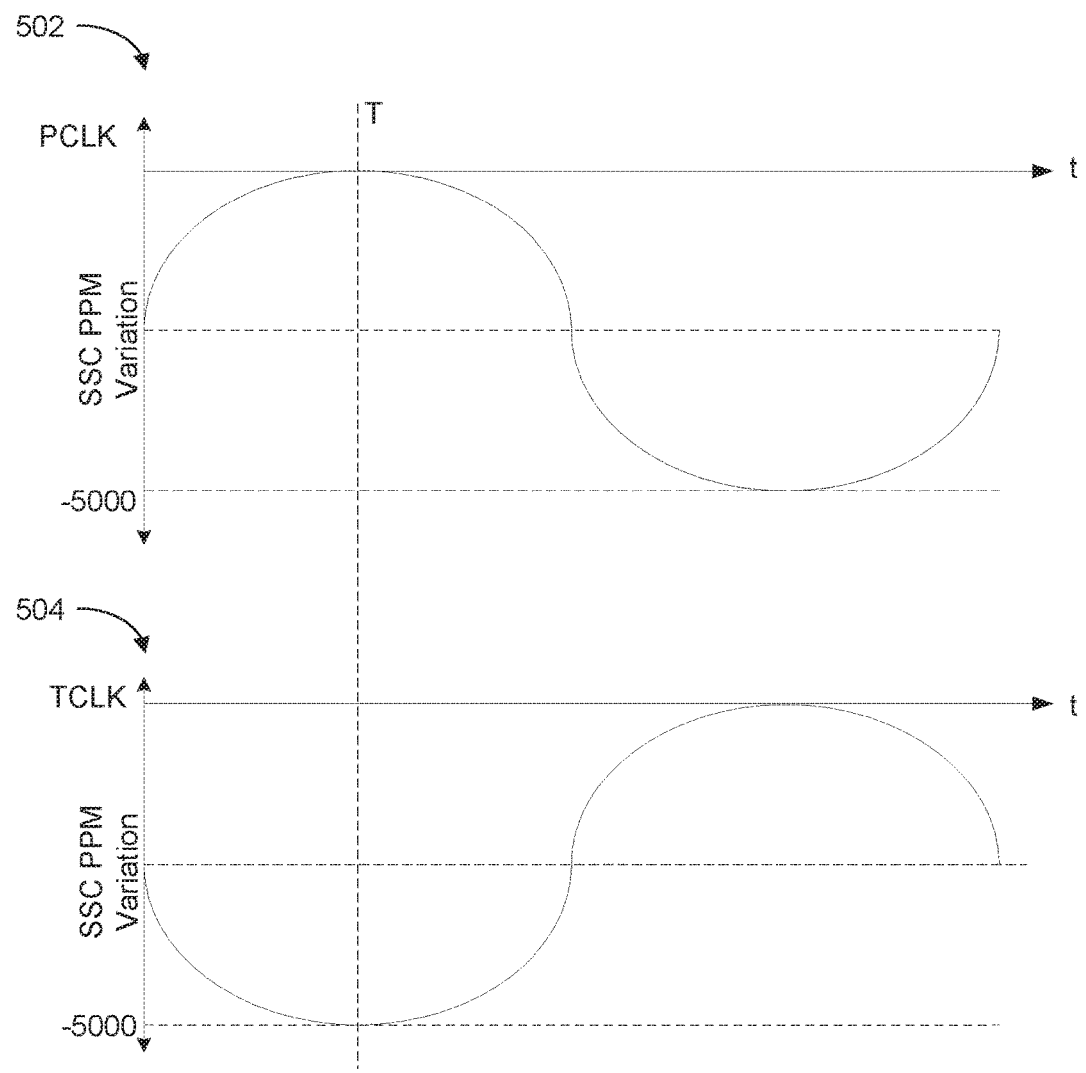
FIG. 5 is a graph of the PPM variations of the PCLK and the TCLK due to modulation of the PCLK and the TCLK using Spread Spectrum Clocking (SSC) in which the PCLK and the TCLK have different sets of reference clock signals.

FIG. 5 shows a graph 502 of an example SSC PPM variation of a PCLK relative to its associated reference clock, and a graph 504 of an example SSC PPM variation of a TCLK relative to its associated reference clock. In the example shown in FIG. 5, the PCLK and the TCLK have different reference clock signals. At the time instance T, which is same as the time instance T of FIG. 4, the SSC PPM variation between the two sets of clock signals is at its maximum absolute value, and is equal to −5000 PPM.

The TCLK, the RCLK, and the PCLK clock signals of the example PCIe interface 300 may be SSC clock signals, non-SSC clock signals, or a combination of SSC clock signals and non-SSC clock signals. The clock signals may also have same set or different sets of reference clock signals. When two sets of clock signals are SSC clock signals, the total PPM variation between the two sets of clock signals is a sum of static PPM variation and SSC PPM variation. When different sets of clock signals have different reference clock signals, each with its own SSC, it is known as Separate RefClk with Independent SSC (SRIS).

Figure 6:
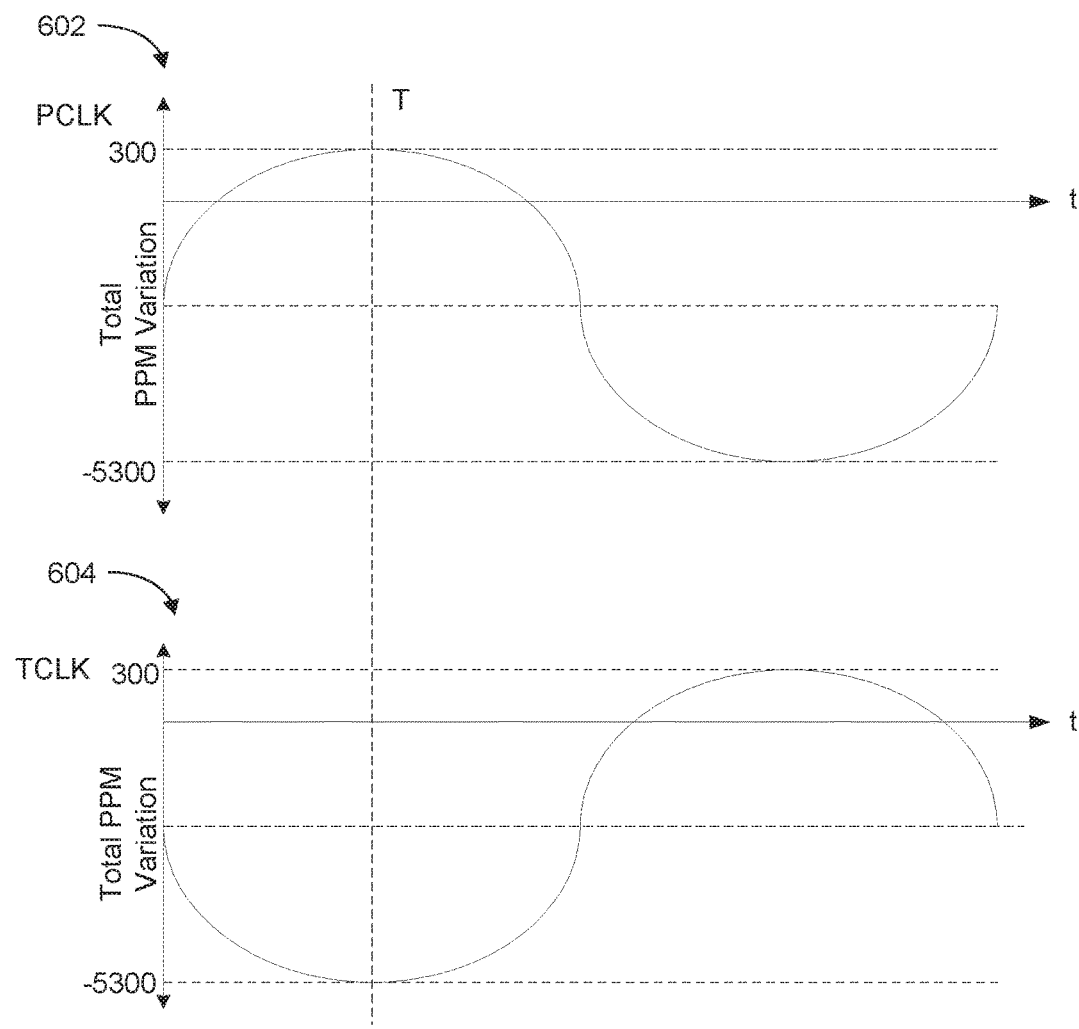
FIG. 6 is a graph of the total PPM variations between the PCLK and the TCLK due to static PPM variations and the SSC.

FIG. 6 shows a graph 602 of the total PPM variation between the PCLK and its associated reference clock, and a graph 604 showing the total PPM variation between the TCLK and its associated reference clock for the examples shown in FIGS. 4 and 5. The total PPM variations shown in the FIG. 6 is generated by adding the static PPM variations shown in FIG. 4 and the SSC PPM variations shown in FIG. 5 for each of the PCLK and TCLK.

As shown in FIG. 6, at the time instance t=T, when the PPM variation between the two sets of clock signals is at its maximum. At t=T the PCLK has a total PPM variation of +300 PPM due to a static PPM variation. The TCLK has a total PPM variation of −5300 PPM due to a static PPM variation of −300 PPM and a SSC PPM variation of −5000 PPM. This results in a maximum total PPM variation between the PCLK and TCLK 5600 PPM.

Figure 7:
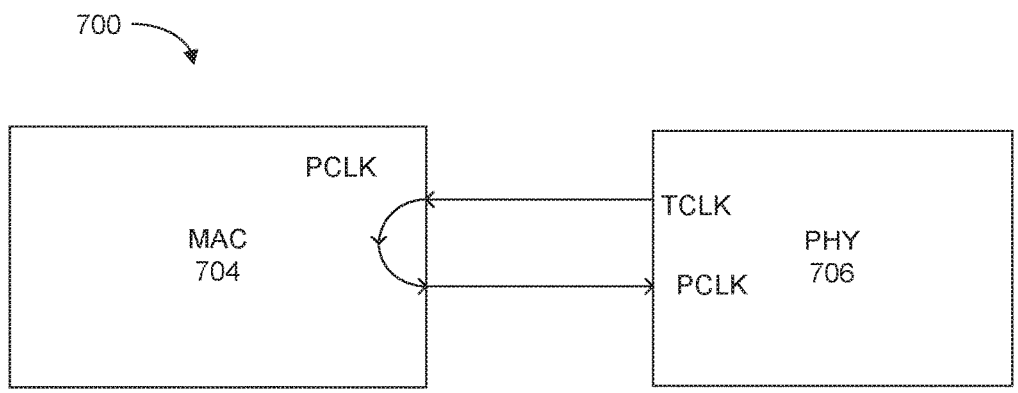
FIG. 7 is a schematic representation of a PCIe interface that includes an example clock compensation system according to the prior art.

An example of a prior art PCIe interface 700 employing a clock compensation scheme is illustrated in the schematic representation shown in FIG. 7. The TCLK is provided to the MAC layer 704, and the TCLK from the MAC layer 704 is looped back to the PHY layer 706, to make the TCLK same as the PCLK, i.e., to make the TCLK and the PCLK synchronous with each other.

In addition to the clock compensation, supporting different generations of PCIe protocols by different ports of the PCIe devices makes port mirroring a challenge. Different generations of the PCIe protocol specify different data rates. For example, PCIe first generation protocol (Gen1) specifies a data rate of 2.5 Gbps. Accordingly, Gen1 clock signals have a frequency of 125 MHz. PCIe second generation protocol (Gen2) specifies a data transfer speed of 5 Gbps and therefore, Gen2 clocks signals have a frequency of 250 MHz. Similarly, PCIe third generation protocol (Gen3) specifies a data transfer speed of 8 Gbps and have clock signals of frequency 500 MHz. Similar to the PPM variations and difference in data rates between the TCLK and the PCLK, PPM variations and difference in data rates can also exist between RCLK and TCLK, RCLK and PCLK.

Figure 8:
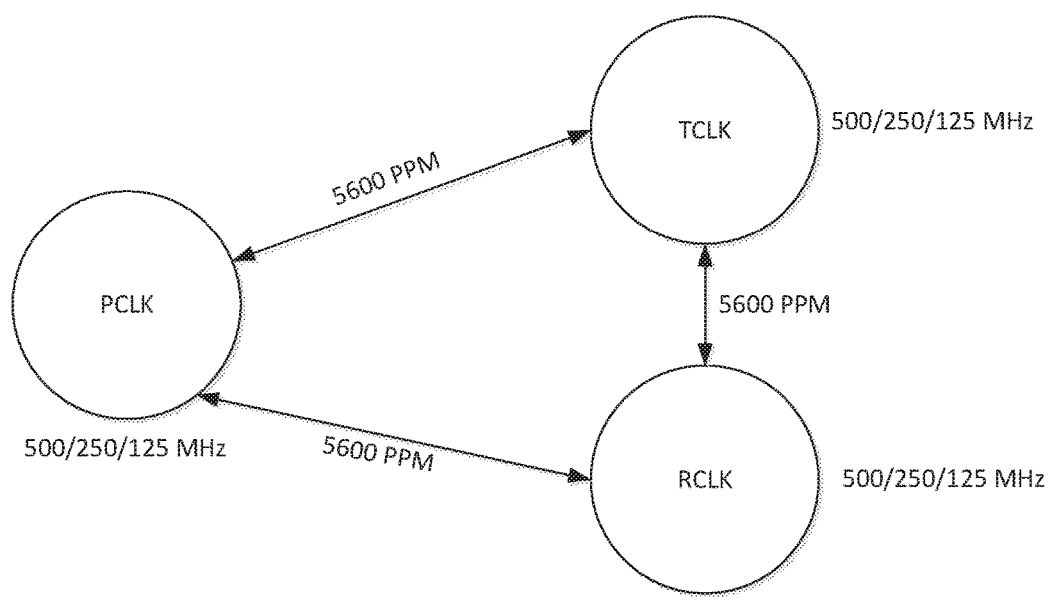
FIG. 8 is a schematic representation of PPM variations between the TCLK, the PCLK, and a receive clock (RCLK) that controls the timing of data flow into the PHY layer from the CPU.

FIG. 8 shows a schematic representation of the maximum total PPM variation of 5600 PPM between the PCLK, the RCLK, and the TCLK clock signals. The total PPM variation of 5600 PPM between the PCLK and the TCLK corresponds to a frequency difference of about 2.78 MHz. Thus, for example, the MAC layer 104 may write data to the PHY layer 106 at a rate faster than a rate at which the PHY layer 106 writes the data to the CPU 102. This may cause loss of data.

Similarly, if for example the MAC layer 104 of the PCIe interface 100 described with reference to FIG. 1 writes data to the PHY layer 106 at a rate slower than a rate at which the PHY layer 106 writes data to the CPU 102, the PHY layer 106 may run out of data to write to the CPU 102. As a result, the PHY layer 106 may rewrite previously written data to the CPU 102. This may cause data corruption. One or more cross clock compensation methods are performed to prevent the data loss and the data corruption caused by the difference in the clock frequencies.

Monitoring the data packets flowing through a PCIe interface from a PHY layer to the CPU, or from the CPU to the PHY layer, may be desirable. The monitoring of the packets may be performed to, for example, analyze traffic, detect intrusion, or passively probe the CPU. However, monitoring an active port directly is generally not possible without disrupting communicating with the CPU in the case of an active link between the CPU and a peripheral device. This is because the CPU and device may be connected using, for example, a printed circuit board, which does not facilitate connecting a monitor directly. Further, monitoring data at the PIPE interface between MAC and PHY layer may not be possible because this interface is within the device. To monitor the flow of packets from the port to the CPU, the packets may be copied to a second port that is not communicating with the CPU. The packets can then be monitored at the second port. The method of monitoring network traffic by copying data from one port to another is commonly known as port mirroring.

Port mirroring is a method of monitoring network traffic by sending a copy of all packets received at one port to another port, where the packet may be analyzed. Port mirroring is typically used for network devices that require monitoring of network traffic, such as intrusion detection systems and passive probes. Although port mirroring has been used for monitoring network traffic, utilizing port mirroring in a PCIe device poses challenges due to various features of the PCIe protocol, such as clock compensation. An example of such a challenge is mirroring an active port that supports the PCIe Gen1 protocol on an inactive port that supports the PCIe Gen2 or Gen3 protocol.

In an aspect of the present subject matter, a port in a PHY layer instance of one PCIe interface can be mirrored to any port in a PHY layer instance of any other PCIe interface by connecting the PHY layer instances of the PCIe interfaces in a ring bus architecture. The ring bus for the port mirroring is hereinafter referred to as port mirror ring.

Figure 9:
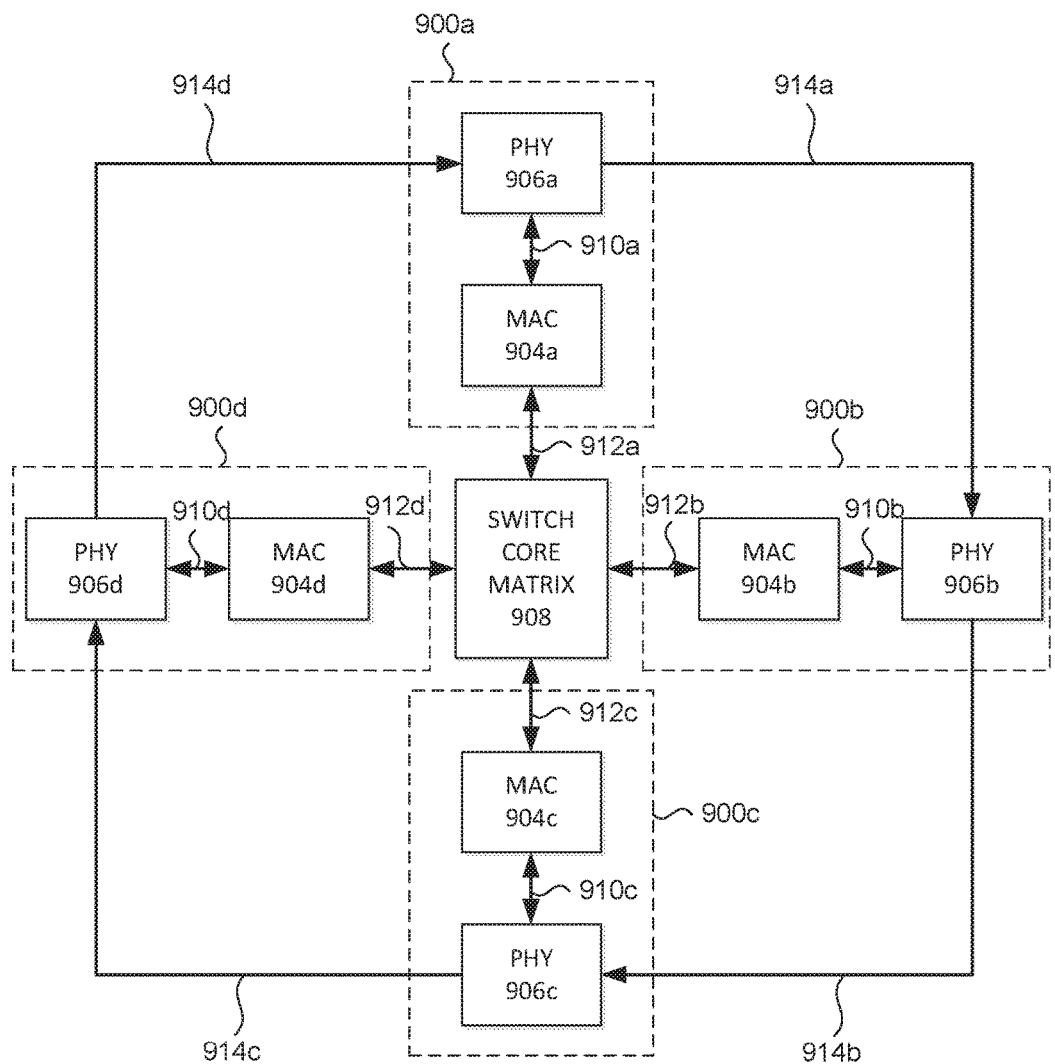
FIG. 9 is a schematic representation of a port mirror ring with four PHY layer instances of the PCIe device, in accordance with an aspect of the present disclosure.

FIG. 9 shows a schematic diagram of an example of port mirroring utilizing a ring bus architecture to connect the PHY layer instances 906a-d of four PCIe interface instances 900a-d. The example port mirror ring shown in FIG. 9 includes four PCIe interface instances 900a-d for illustrative purposes. In other examples, more or less than four PCIe interface instances 900a-d may be connected in a ring bus architecture for port mirroring. The PHY layer instances 906a-d may also be referred to as Physical Coding Sublayer (PCS)-Physical Medium Attachment (PMA) instance, or, in short, PCS-PMA instance.

The respective PHY layer instance 906a-d and MAC layer instance 904a-d of each PCIe interface instance 900a-d includes respective PIPE ports 910a-d to provide for receiving and sending data between the PHY layer instance 906a-d and the MAC layer instance 904a-d. Further, connections 912a-d connect the MAC layer instances 904a-d to a switch core matrix 908. The switch core matrix 908 may be a hardware logic for routing data from one MAC layer instance 904a-d to another MAC layer instance 904a-d.

The port mirror ring bus architecture is provided by port mirror connections 914a-d that are utilized to connect each PHY layer instance 906a-d to the respective next PHY layer instance 906a-d, as shown in FIG. 9.

Because the port mirror connections 914a-d between the PHY layer instances 906a-d are separate from the switch core matrix 908, the port mirror connections do not depend on the switch core matrix 908 for routing data from the ports of one PHY layer instance 906a-d to another PHY layer instance 906a-d in order to perform port mirroring. In addition to mirroring data, the port mirror connections 914a-d may also be used to carry control signals for mirroring the control signals of one PHY layer instance 906a-d to another PHY layer instance 906a-d. The control signals may be utilized, for example, to determine validity of the data. Further, the port mirror ring can be used to mirror debug information sent by, for example, a CPU or MAC layer instance 904a-d, respectively.

Figure 10:
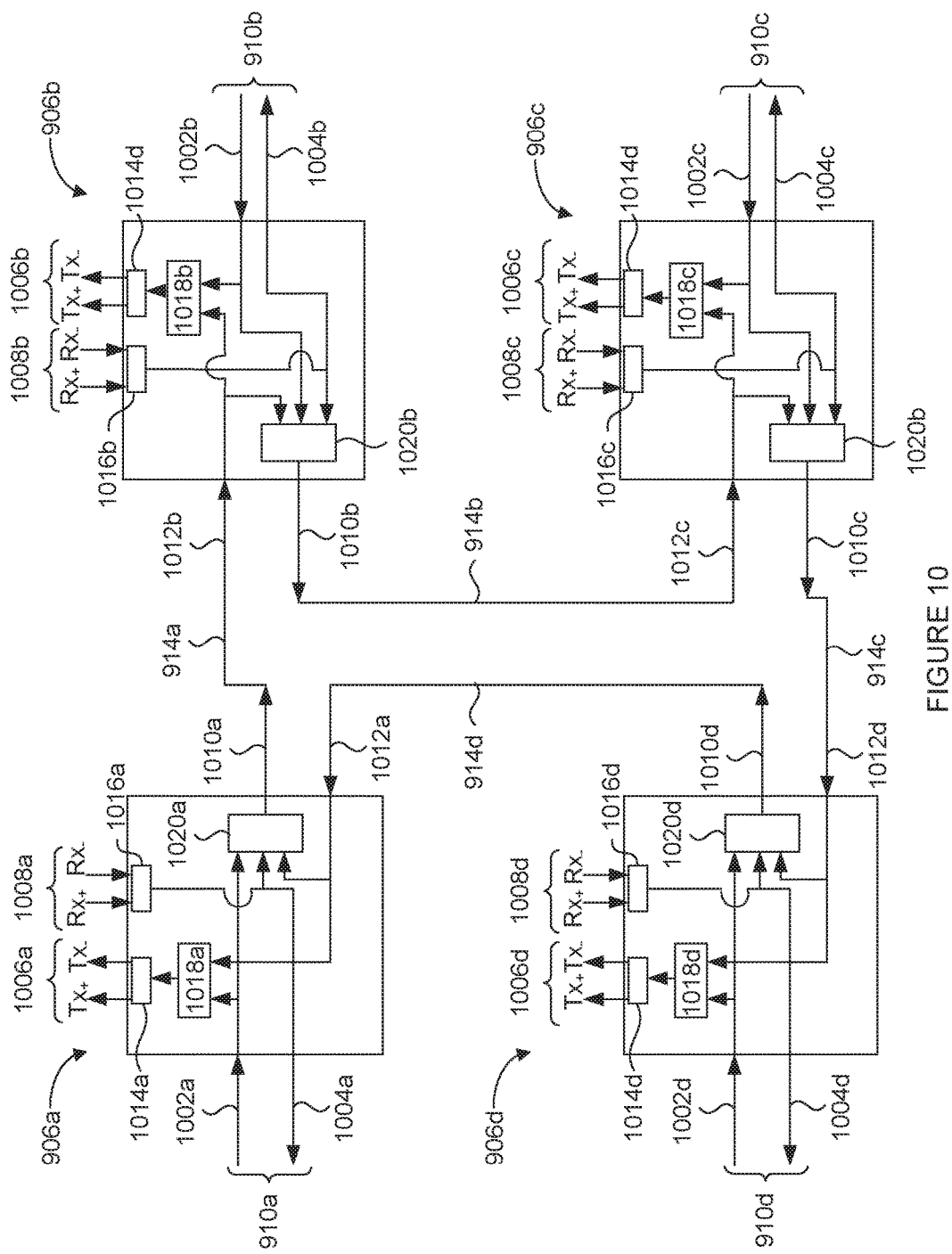
FIG. 10 is a schematic representation of the four PHY layer instances in the port mirror ring of FIG. 9 in greater detail, in accordance with an aspect of the present disclosure.

FIG. 10 is a schematic diagram showing the four example PHY layer instances 906a-d in the port mirror ring of FIG. 9 in greater detail.

Each PHY layer instance 906a-d includes PIPE_Tx ports 1002a-d, respectively, to receive data from the corresponding MAC layer instance 904a-d, respectively, for transfer to the CPU (not shown), and PIPE_Rx ports 1004a-d, respectively, to send data to the respective corresponding MAC layer instance 904a-d. The PIPE_Tx ports 1002a-d and the PIPE_Rx ports 1004a-d are coupled to the MAC layer instance 904a-d by the respective PIPE connection 910a-d described above. The PIPE_Tx ports 1002a-d and the PIPE_Rx ports 1004a-d may include multiple bifurcated ports that are included in one or more cores, as described above with reference to FIG. 2.

Each PHY layer instance 906a-d includes respective output transmission ports 1006a-d that send data from the PHY layer instance 906a-d to a CPU (not shown), and respective input receive ports 1008a-d that receive data from the CPU. Each PHY layer instance 906a-d also includes respective port mirror output (PM_OUT) ports 1010a-d and respective port mirror input (PM_IN) ports 1012a-d. As shown in FIG. 10, the PM_OUT ports 1010a of PHY layer instance 906a are connected to the PM_IN ports 1012b of PHY layer instance 906b by connection 914a, the PM_OUT ports 1010b of PHY layer instance 906b are connected to the PM_IN ports 1012c of PHY layer instance 906c by connection 914b, the PM_OUT ports 1010c of PHY layer instance 906c are connected to the PM_IN ports 1012d of PHY layer instance 906d by connection 914c, and the PM_OUT ports 1010d of PHY layer instance 906d are connected to the PM_IN ports 1012a of PHY layer instance 906a by connection 914d. In this way, all of the PHY layer instances 906a-d are connected together in a port mirror ring.

Each PHY layer instance 906a-d includes respective output transmission (Tx) ports 1006a-d for transmitting data from the respective PHY layer instance 906a-d to a CPU (not shown) and respective input receive ports for receiving data from the CPU. Each PHY layer instance 906a-d may convert the data to be transmitted to the CPU into analog signals Tx+ and Tx− utilizing a respective digital to analog converter (DAC) 1014a-d. The conversion of the data to analog signals Tx+ and Tx− is defined by the PIPE specification. Similarly, each PHY layer instance 906a-d may optionally include an analog to digital converter (ADC) 1016a-d that converts analog signals Rx+ and Rx− received from the CPU into a digital signal that may, for example, be transmitted to the respective MAC layer instance 904a-d. The conversion of the analog data signals Rx+ and Rx− to a digital signal is defined by the PIPE specification.

Further, each PHY layer instance 906a-d includes a respective transmission multiplexer 1018a-d that determines whether the data output at the respective output transmission ports 1006a-d is the data received at the PIPE_Tx ports 1002a-d, i.e., the data received from the respective MAC layer instance 904a-d, as shown in FIG. 9, via the respective PIPE port 910a-d, or the data received from PM_IN ports 1012a in order to port mirror one of the other PHY layer instances 906a-d. The output from a particular set of output transmission ports 1006a-d can be directed to either the CPU when the associated PHY layer instance 906a-d is active, or to an analyzer when the associated PHY layer instance 906a-d is inactive, coupled to an analyzer, and mirroring ports of another active PHY layer instance 906a-d.

In the present disclosure, a PHY layer instance 906a-d is said to be "active" when the PHY layer instance 906a-d receives packets from, and sends packets to, the CPU. Otherwise, the PHY layer is said to be "inactive". In addition, some ports of a PHY layer instance 906a-d may be active, while others may be inactive.

The selection of one the PIPE-Tx data and the PM_IN data by each transmission multiplexer 1018a-d may be controlled by a transmission multiplexer control signal (not shown). The transmission multiplexer control signal may be provided to the transmission multiplexer 1018a-d by, for example, a configurable firmware register (not shown). The firmware register may be configured by a user, for example, through a user interface, depending on whether the output transmission ports 1006a-d are to transmit PIPE_Tx data or PM_IN data. The configuration by the user may be performed at any time, which ensures dynamic configuration of the output transmission ports 1006a-d of the PHY layer instances 906a-d to transmit PM_IN data received at the PM_IN ports 1012a-d or data received at the respective PIPE port 910a-d.

In FIG. 10, each of the transmission multiplexers 1018a-d is shown as a single instance for the sake of clarity. However, transmission multiplexers 1018a-d may be a plurality of multiplexer instances depending on the number of PIPE_Tx ports 1002a-d and the port bifurcation granularity, i.e., number of PIPE_Tx ports 1002a-d and PIPE_Rx ports 1004a-d per core. In the case in which a transmission multiplexer 1018a-d is provided by a plurality of multiplexer instances, the PHY layer instance 906a-d will include a number of DAC 1014a instances that corresponds to the number of multiplexer instances.

In an example of a plurality of multiplexer instances, the number of PIPE_Tx ports 1002a-d is sixteen for each PHY layer instance 906a-d and the port bifurcation granularity is 16×1, i.e., each core has one PIPE_Tx port 1002a-d and one PIPE_Rx port 1004a-d, the number of multiplexer instances is sixteen. In another example, if PIPE_Tx data is received at eight PIPE_Tx ports 1002a of a PHY layer instance 906a and the PM_IN data arrives in sixteen ports at the PM_IN ports 1012a, eight multiplexer instances will receive data from both the PIPE_Tx ports 1002a and the PM_IN ports 1012a, and the other eight multiplexer instances will receive data from the PM_IN ports 1012a only. Accordingly, the first eight multiplexer instances in this example will select the PIPE_Tx data from the eight PIPE_Tx ports 1002s while the remaining eight multiplexer instances will select the PM_IN data arriving from eight of the sixteen PM_IN ports 1012a.

Each PHY layer instance 906a-d includes a respective port mirror multiplexer 1020a-d to select one of the three sets of data, i.e., PM_IN data, PIPE_Tx data, and PIPE_Rx data, for sending out at the PM_OUT ports 1012a-d. Each of the port mirror multiplexer 1020a-d may include a plurality of multiplexers in two stages, as explained in more detail below with reference to FIG. 13.

In operation, a PHY layer instance, for example PHY layer instance 906a, may receive, at the PM_IN ports 1012a, PM_IN data from a previous PHY layer instance in the port mirror ring, for example, PHY layer instance 906d. Similar to the PIPE_Tx data and the PIPE_Rx data, the PM_IN data may also arrive in any number of ports PM_IN ports 1012a. The PHY layer instance 906a can mirror the PM_IN data on its own inactive output transmission ports 1006a.

If the number of inactive output transmission ports 1006a is greater than or equal to the number of PM-IN 1012a ports on which the PM_IN data arrives, the PHY layer instance can mirror all PM_IN data on the inactive output transmission ports 1006a. For mirroring the data, the PHY layer instance 906a outputs the PM_IN data for analysis by an analyzer. As described above, the data may optionally be output as Tx+ and Tx− analog signals.

If the number of inactive output transmission ports 1006a of a particular PHY layer instance 906a is less than the number of PM_IN ports 1012a on which the PM_IN data arrives, the PHY layer instance 906a cannot mirror the entire PM_IN data on its own inactive output transmission ports 1006a ports. Following the example introduced above in which PIPE_Tx data is arriving on eight PIPE_Tx ports 1002a and the PM_IN data is arriving on sixteen PM_IN ports 1012a, then eight output transmission ports 1006a are active to transmit the PIPE_Tx data, leaving eight inactive output transmission ports 1006a. Therefore, because the PM_IN data is arriving in sixteen PM_IN ports 1012a, only the PM_IN data arriving at eight of the sixteen PM_IN ports 1012a ports may be mirrored in the output transmission ports 1006a of the PHY layer instance 906a, because the PHY layer instance has only eight inactive output transmission ports 1006 available.

The PHY layer instance 906a can send the PM_IN data that cannot be mirrored on its output transmission ports 1006 at the PM_OUT ports 1010a as PM_OUT that are transmitted to the next PHY layer instance 906b in the mirror ring.

In general, the PM_OUT data output at PM_OUT ports 1010a-d of a PHY layer instance 906a-d is the data output by that PHY layer 906a-d instance that is to be port mirrored. In addition to the PM_IN data that cannot be mirrored by the PHY layer instance 906a-d, the PHY layer instance 906a-d can send data from its own output transmission ports 1006a-d that are to be mirrored also as PM_OUT data output at the PM_OUT ports 1010a-d such that the PM_OUT data includes both PM_IN data and data from the output transmission ports 1006a-d. Still further, the PHY layer instances 906a-d may output the PIPE_Rx data received at the Rx ports 1008a-d on the PM_OUT ports 1010a-d for mirroring.

In an example, the PIPE_Tx data in received by a PHY layer instance 906a at sixteen PIPE_Tx ports 1002a is to be mirrored at one of the other PHY layer instances 906b-d. In this example, the port mirror multiplexer 1020a of the PHY layer instance 906a selects the PIPE_Tx data received at the PIPE_Tx ports 1002a for output at the PM_OUT ports 1010a. The PM_OUT data is received at the PM_IN ports 1012b of the PHY layer instance 906b via connection 914a.

In this example, the PHY layer instance 906b does not have any inactive output transmission ports 1006b for mirroring the PM_IN data because the transmission multiplexer 1018b is selecting the PIPE_Tx data received at the PIPE_Tx ports 1002b for sending to the DAC 1014a. Therefore, the port mirror multiplexer 1020a selects the PM_IN data received at the PM_IN 1012b ports for outputting at the PM_OUT ports 1010b. Thus, the PIPE_Tx data of the PHY layer instance 906a is provided to the PHY layer instance 906c as PM_IN data received at the PM_IN ports 1012c. If the PHY3 instance has sixteen inactive output transmission ports 1006c available for outputting the PM_IN data, the transmission multiplexer 1018c of the PHY layer instance 906c selects the PM_IN ports 1012c for output to its DAC 1014c in order to mirror the PIPE_Tx ports 1002a of the PHY layer instance 906a. The DAC 1014c converts the PM_IN data into analog signals Tx+ and Tx−, which can then be received by an analyzer that can analyze the analog signals.

In general, the rate at which the PM_IN data is received from the previous PHY layer instance 906a-d and the rate at which PM_IN data is sent to the transmission multiplexer 1018a-d and the port mirror multiplexer 1020a-d may be different if PPM variations exist between the clock signals used by the different PHY layer instances, as explained previously. The PPM variations may be the results of, for example, the different PHY layer instances 906a-d operating with clock signals in different clocking modes, such as common clocking, asynchronous clocking, SRIS, and SSC. Due to the PPM variations, it is possible that, at times, the PM_IN data is received at the PM_IN ports 1012a-d at a rate that is faster than the rate at which the PM_IN data is sent to the DAC 1014a-d. As described above, this rate different may cause some of the PM_IN data to be lost. Similarly, if the PM_IN data is received at the PM_IN ports 1012a-d at a rate that is slower rate than the rate at which the PM_IN data is sent to the transmission multiplexer 1018a-d, at times there may be no data to be sent to the DAC 1014a-d, causing data corruption.

To eliminate the problem associated with the usage of different clocking modes in different PHY layer instances 906a-d, the PHY layer instances 906a-d may include an elastic buffer known as Tx elastic first-in-first-out (FIFO) buffer (not shown). When the PM_IN data is received at the PHY layer instance 906a-d at a rate faster than the rate at which the data is sent to the transmission multiplexer 1018a-d, the Tx elastic FIFO stores the PM_IN until the transmission multiplexer 1018a-d is ready to receive it. Conversely, when the PM_IN data is received at the PHY layer instance 906a-d at rate slower than the rate at which the PM_IN data is sent to the transmission 1018a-d, the Tx elastic FIFO may periodically send SKIP ordered sets, which are redundant data bytes that are defined by the PCIe protocol, to the transmission multiplexer 1018a-d.

Figure 11:
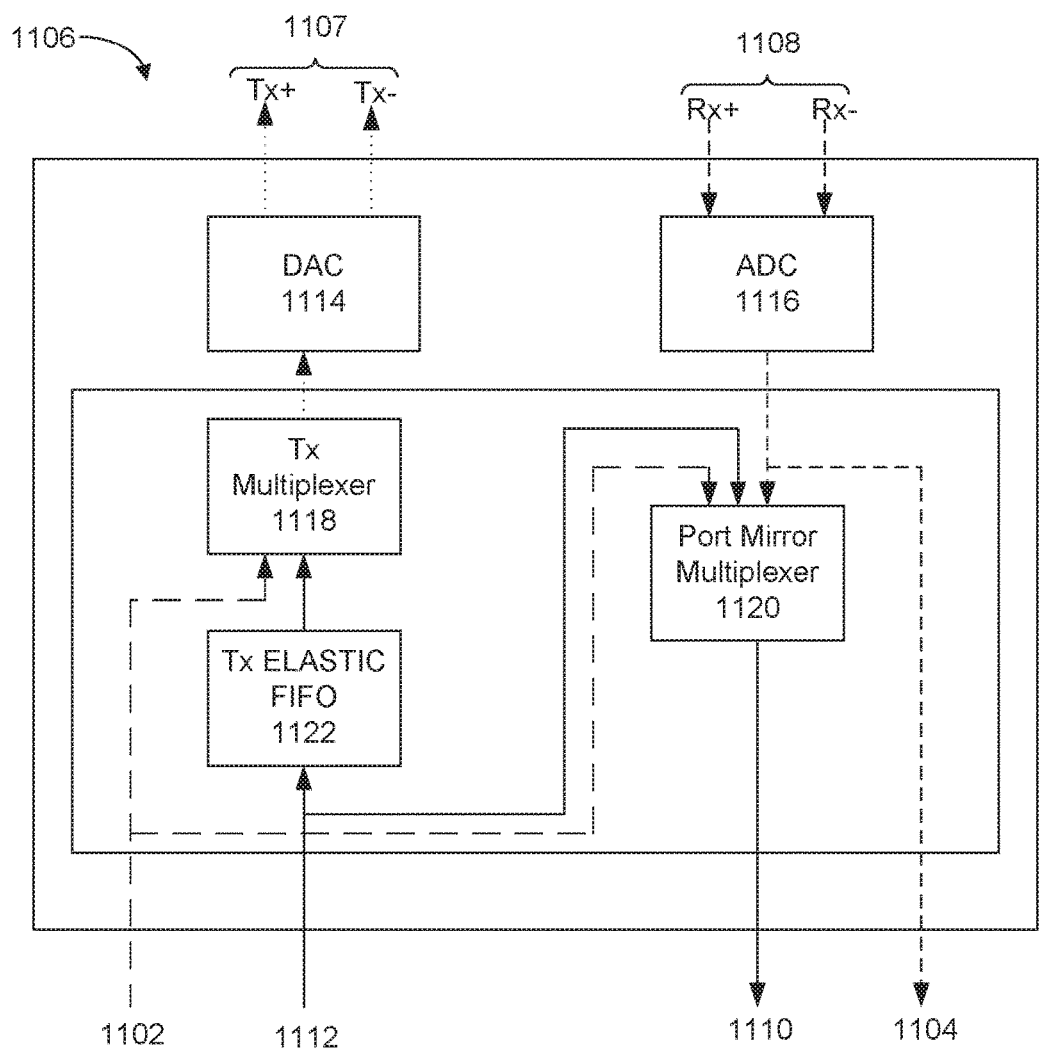
FIG. 11 is a schematic representation of a PHY layer instance having a Tx Elastic First In First Out (FIFO) buffer for clock compensation, in accordance with an aspect of the present disclosure.

FIG. 11 is a schematic representation of an example PHY layer instance 1106 that includes Tx elastic buffer 1122 that may utilized to perform cross clock compensation. The example PHY layer instance 1106 shown in FIG. 11 may be utilized as any of the PHY layer instances 906a-d shown in FIGS. 9 and 10.

The PHY layer instance 1106 includes PIPE_Tx ports 1102, PIPE_RX ports 1104, output Tx ports 1107, input Rx ports 1108, PM_OUT ports 1110, PM_IN ports 1112, DAC 1114, ADC 1116, transmission multiplexer 1118 and port mirror multiplexer 1120 that are similar to PIPE_Tx ports 1002, PIPE_RX ports 1004, output transmission ports 1006, input receive ports 1008, PM_OUT ports 1010, PM_IN ports 1012, DAC 1014, ADC 1016, transmission multiplexer 1018 and port mirror multiplexer 1020 of the PHY layer instances 906a-d described above with reference to FIG. 10.

In the example PHY layer instance 1106 shown in FIG. 11, the PM_IN data received at the PM_IN port 1112 is input into the Tx elastic buffer 1122 in order to provide cross clock compensation as described above.

In some cases, it may be desirable to mirror ports of a PHY layer instance on inactive ports of that same PHY layer instance. However, if, for example, the PIPE_Tx data of a portion of the PIPE_Tx ports 1002a of the PHY layer instance 906a were to be mirrored on inactive output transmission ports 1006a of the same PHY layer instance 906a, the PIPE_Tx data must traverse the entire port mirror ring before being mirrored. This is because the PHY layer instances 906a-d shown in FIG. 10 are not configured such that the PIPE_Tx data transmitted on the active output transmission ports 1006a can be input to the inactive transmission ports 1006a without traversing the port mirror ring.

Similarly, the PIPE_Rx data from the active input receive ports 1008a of the PHY layer instance 906a cannot be mirrored on the inactive output transmission ports 1006a without traversing the entire ring and arrive at the PHY layer instance as PM_IN data.

Figure 12:
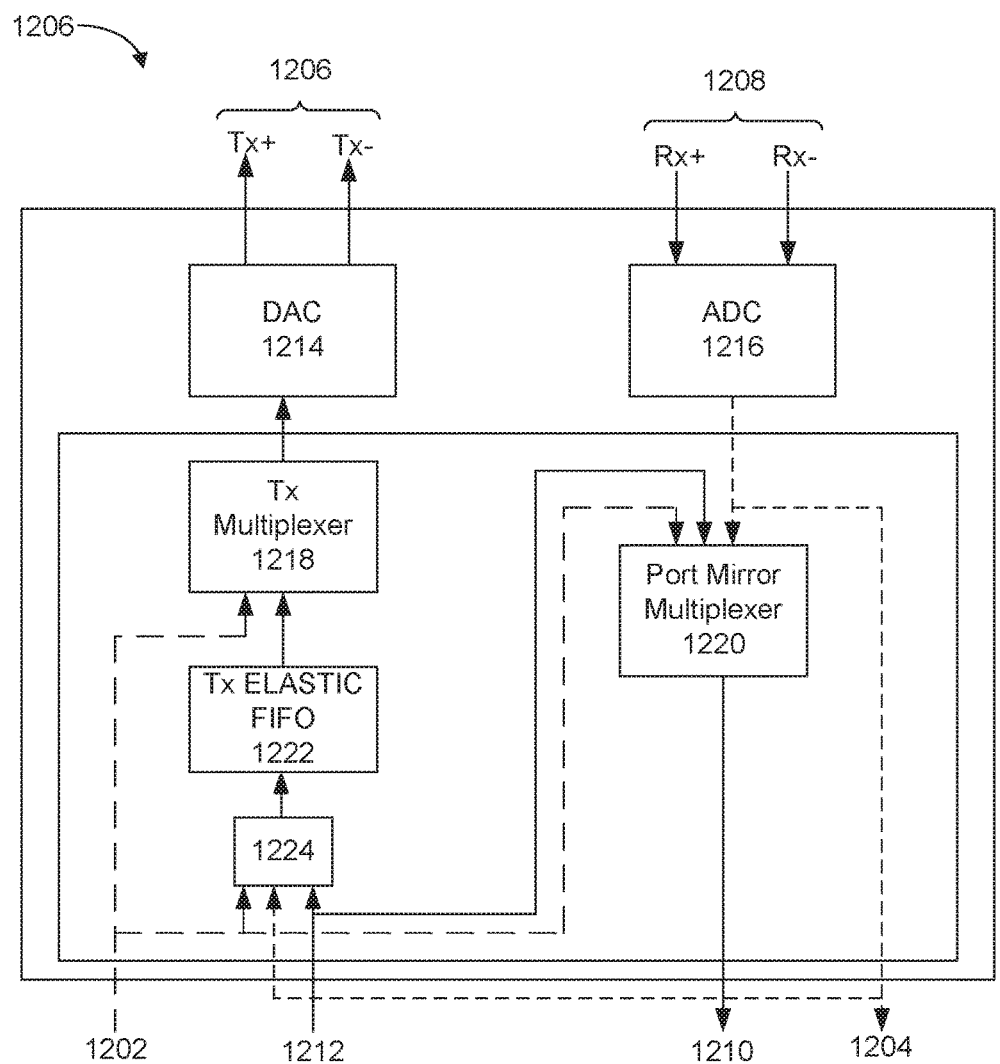
FIG. 12 is a schematic representation of the PHY layer instance of FIG. 11 with an additional multiplexer, in accordance with an aspect of the present disclosure.

FIG. 12 illustrates an example PHY layer instance 1206 that is configured to mirror PIPE_Tx data or PIPE_Rx data on inactive output transmission ports 1207 of the PHY layer instance 1206 without the data traversing the entire port mirror ring before mirroring. The PHY layer instance 1206 includes PIPE_Tx ports 1202, PIPE_RX ports 1204, output transmission ports 1207, input Rx ports 1208, PM_OUT ports 1210, PM_IN ports 1212, a DAC 1214, an ADC 1216, a transmission multiplexer 1218, a port mirror multiplexer 1220, and a Tx elastic FIFO 1222 that are similar to PIPE_Tx ports 1102, PIPE_RX ports 1104, output transmission ports 1107, input Rx ports 1208, PM_OUT ports 1110, PM_IN ports 1112, DAC 1114, ADC 1116, transmission multiplexer 1118, port mirror multiplexer 1120, and Tx elastic buffer 1122 of the PHY layer instances 1106 described above with reference to FIG. 11.

In addition, the PHY layer instance 1206 includes a multiplexer 1224 into which has inputs coupled to the PIPE_Tx ports 1202, the PIPE_Rx ports 1204, and PM_IN ports 1212. The multiplexer 1224 can be used to select the one of the PIPE_Tx data, the PIPE_Rx data, and PM_IN data for mirroring on the inactive transmission ports 1206 of the PHY layer instance 1206. The presence of the multiplexer 1224 reduces the traversal of the entire port mirror ring by the PIPE_Tx data or the PIPE_Rx data prior to mirroring.

Figure 13:
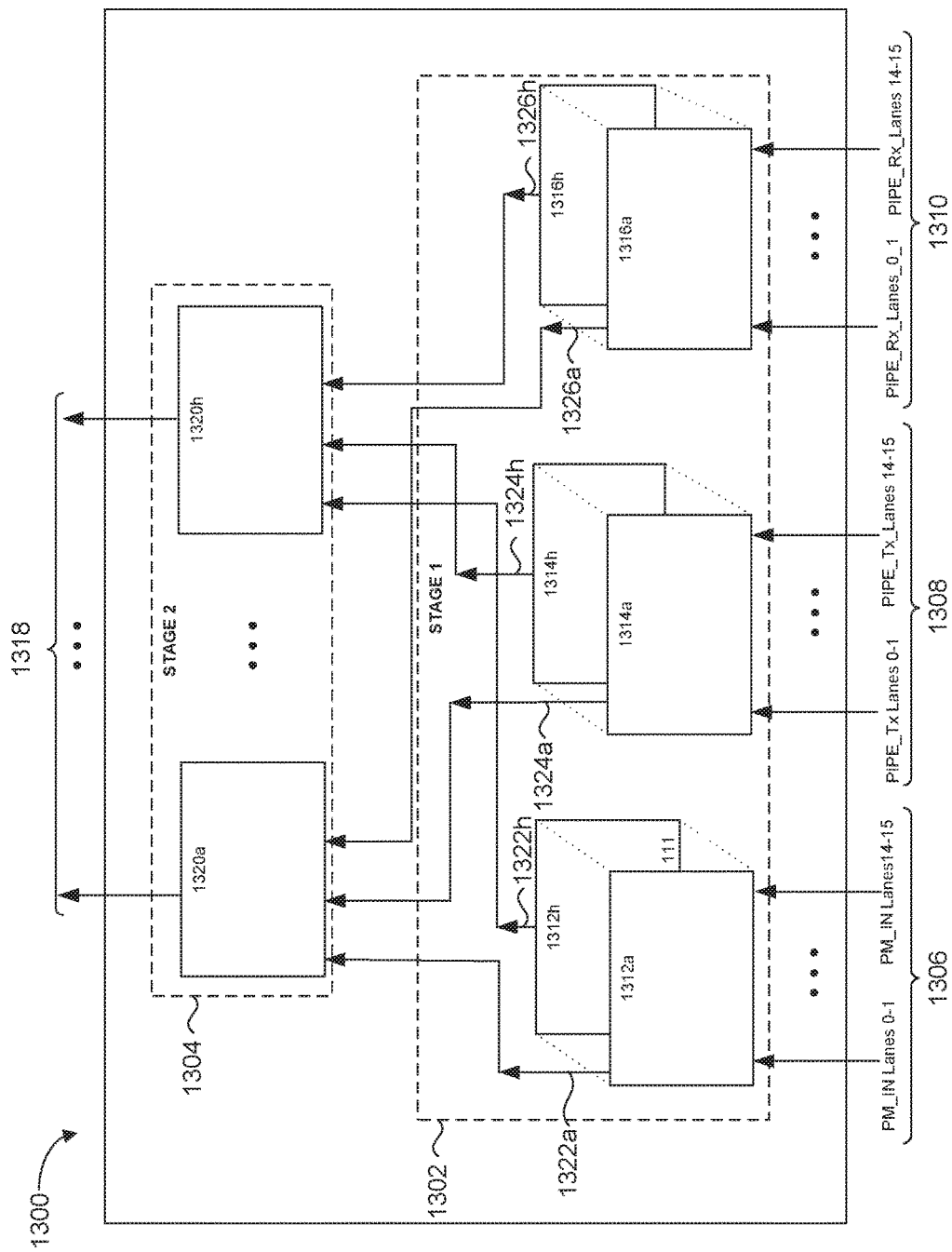
FIG. 13 is a schematic representation of a port mirror multiplexer used in the PHY layer instance, in accordance with an aspect of the present disclosure.

As mentioned above, the port mirror multiplexers 1020a-d may each include a plurality of multiplexers in two stages for selection of data to be output at the PM_OUT ports 1010a-d. FIG. 13 illustrates an example of such a port mirror multiplexer 1300 in greater detail. The port mirror multiplexer 1300 includes a plurality of multiplexers in two stages, a first stage 1302 and a second stage 1304.

The first stage 1302 includes three different sets of multiplexer instances. PM_IN data 1306 is input to a set of first multiplexer instances 1312a-h. PIPE_Tx data 1308 is input to a set of second multiplexer instances 1314a-h. PIPE_Rx 1310 data is input to a set of third multiplexer instances 1316a-h. In the example shown in FIG. 13, the number of first multiplexer instances 1312a-h, second multiplexer instances 1314a-h, and third multiplexer instances 1316a-h is eight.

In general, the number of multiplexer instances included in each the sets of first, second, and third multiplexer instances 1312a-h, 1314a-h, 1316a-h depends on the number of PM_OUT ports on which the PM_OUT data 1318 is output to and the granularity of the port bifurcation of the PM_OUT ports. In the example shown in FIG. 13, the PM_OUT data is sent in sixteen ports and the port bifurcation granularity is 8×2, i.e., two transmission ports and two Rx ports form part of one core, the PM_OUT data will be sent as eight sets PM_OUT data 1318, where each set may including data from two ports, such as, for example, two PIPE_Tx ports or two PIPE_Rx ports. Therefore, the number of instances included in each of the first, second, and third sets of multiplexer instances 1312a-h, 1314a-h, 1316a-h in the example shown in FIG. 13 is eight.

In another example, the PM_OUT data is to be sent in sixteen ports and the port bifurcation granularity is 16×1, i.e., one Tx port and one Rx port form part of one core, the PM_OUT data will be sent as sixteen PM_OUT sets, each set having data from one port, such as, for example, one PIPE_Tx port or one PIPE_Rx port. In this example, the number of instances included in each of the first, second, and third sets of multiplexers 1312*a-h*, 1314*a-h*, 1316*a-h* is sixteen.

The second stage 1304 includes a set of fourth multiplexer instances 1320*a-h*. Each of the fourth multiplexer instances 1320*a-h* outputs one of the sets of PM_OUT data 1318.

Each of the first multiplexer instances 1312*a-h* receives the PM_IN data 1306 from all sixteen of the PM_IN ports. The PM_IN data 1306 from the sixteen PM_IN ports is received as eight pairs in the example shown. For example, data from the first two PM_IN ports are received as a first pair and data from the next two PM_IN ports are received as the second pair, and so forth. In FIG. 13, the eight pairs of PM_IN data 1306 data are represented as: PM_IN Lanes 0-1, PM_IN Lanes 2-3 . . . PM_IN Lanes 14-15.

Similarly, each of the second multiplexer instances 1314*a-h* receives the PIPE_Tx data 1308 from all sixteen PIPE_Tx ports, in eight pairs represented by PIPE_Tx Lanes 0-1, PIPE_Tx Lanes 2-3 . . . PIPE_Tx Lanes 14-15. Each of the third multiplexer instances 1316*a-h* receive all of the PIPE_Rx data 1310 from all sixteen PIPE_Rx ports, in eight pairs represented by PIPE_Rx Lanes 0-1, PIPE_Rx Lanes 2-3 . . . PIPE_Rx Lanes 14-15.

In operation, each of the first multiplexer instances 1312*a-h* selects one of the eight pairs of PM_IN data 1306. The pairs selected by the first multiplexer instances 1312*a-h* are output as a set of first outputs 1322*a-h*, each first output 1322*a-g* corresponding to an associated one of the first multiplexer instances 1312*a-h*. Each of the first outputs 1322*a-h* is sent to a respective one of the fourth multiplexer instances 1320*a-h*. In the example shown in FIG. 13, first multiplexer instance 1312*a* outputs a first output 1322*a* which is input to the fourth multiplexer instance 1320*a* of the second stage, the first multiplexer instance 1312*h* outputs a first output 1322*h* which is output to the fourth multiplexer instance 1320*h* of the second stage 1304, and so forth with the other first multiplexer instances 1322*b-g*.

Similarly, each of the second multiplexer instances 1314*a-h* selects one of the eight pairs of PIPE_Tx data 1308, forming a set of second outputs 1324*a-h*, each second output 1324*a-h* corresponding to an associated one of the second multiplexer instances 1314*a-h* as shown in FIG. 13. Each of the second outputs 1324*a-h* is sent to a respective one of the fourth multiplexer instances 1320*a-h*.

Similarly, each of the third multiplexer instances 1316*a-h* selects one of the eight pairs of PIPE_Rx data 1310, forming a set of third outputs 1326*a-h*, each third output 1326*a-h* corresponding to an associated one of the third multiplexer instances 1316*a-h* as shown in FIG. 13. Each of the third outputs 1326*a-h* is sent to a respective one of the fourth multiplexer instances 1320*a-h*.

In the example port mirror multiplexer 1300, any of the first multiplexer instance 1312*a-h* can select any pair of PM_IN data 1306. Therefore, the first PM_IN pair can be output at PM_OUT 1318 as the last PM_OUT pair for mirroring. However, as described above, the selection of different pairs will depend on the number of ports per core. Similarly, any of the second multiplexer instance 1314*a-h* may select any pair of PIPE_Tx data 1308 and any of the third multiplexer instance 1316*a-h* may select any pair of PIPE_Rx data 1310.

Each of the fourth multiplexer instances 1320*a-h* receives a corresponding one of the set of first outputs 1322*a-h*, the set of second outputs 1324*a-h*, and the set of third outputs 1326*a-h*. For example, fourth multiplexer instance 1320*a* receives first output 1322*a* from first multiplexer instance 1312*a*, second output 1324*a* from second multiplexer instance 1314*a*, and third output 1326*a* from third multiplexer instance 1316*a*. Each of the fourth multiplexer instances 1320*a-h* selects one of inputs to output as the PM_OUT data 1318.

The output of the fourth multiplexer instance 1320*a-h* need not all be the same data type, such that a first portion of the PM_OUT data 1318 corresponds to, for example, PM_IN data 1306 while a second portion of the PM_OUT data 1318 corresponds to, for example, PIPE_Tx data 1308 or PIPE_Rx data 1310. Thus, the port mirror multiplexer 1300 enables flexibility of simultaneously outputting different types of data from a PHY layer instance for mirroring at another PHY layer instance. Further, the selection by the first multiplexer instances 1312*a-h* may be utilized to select which PM_OUT ports the PM_IN data 1306 is transmitted on. For example, if the first multiplexer instance 1312*a* selects the last pair of the PM_IN data 1306, i.e., "PM_IN Lanes 14-15", as the first output 1322*a*, then the first two PM_OUT ports will transmit the last pair of the PM_IN data 1306 provided the fourth multiplexer instance 1320*a* selects the first input 1322*a*. Thus, using the port mirror multiplexer 1300 enables mirroring data arriving at any port to any other port.

The selection by each first multiplexer instance 1312*a-h*, second multiplexer instance 1314*a-h*, third multiplexer instance 1316*a-h*, and fourth multiplexer instance 1320*a-h* may be controlled by a respective control signal (not shown). The control signals may be provided by, for example, a configurable firmware register. The firmware register may be configured by, for example, a user.

Although the example shown in FIG. 13 shows data that is selected in pairs (data from two ports forming part of an input to a multiplexer), the selection can be performed on a per port basis as well. For port to port mirroring of the sixteen ports included in the PM_IN data 1306, the PIPE_Tx data 1308, and the PIPE_Rx data 1310, sixteen multiplexer instances need to be included in each of the sets of first, second, third, and fourth multiplexer instances.

Figure 14:
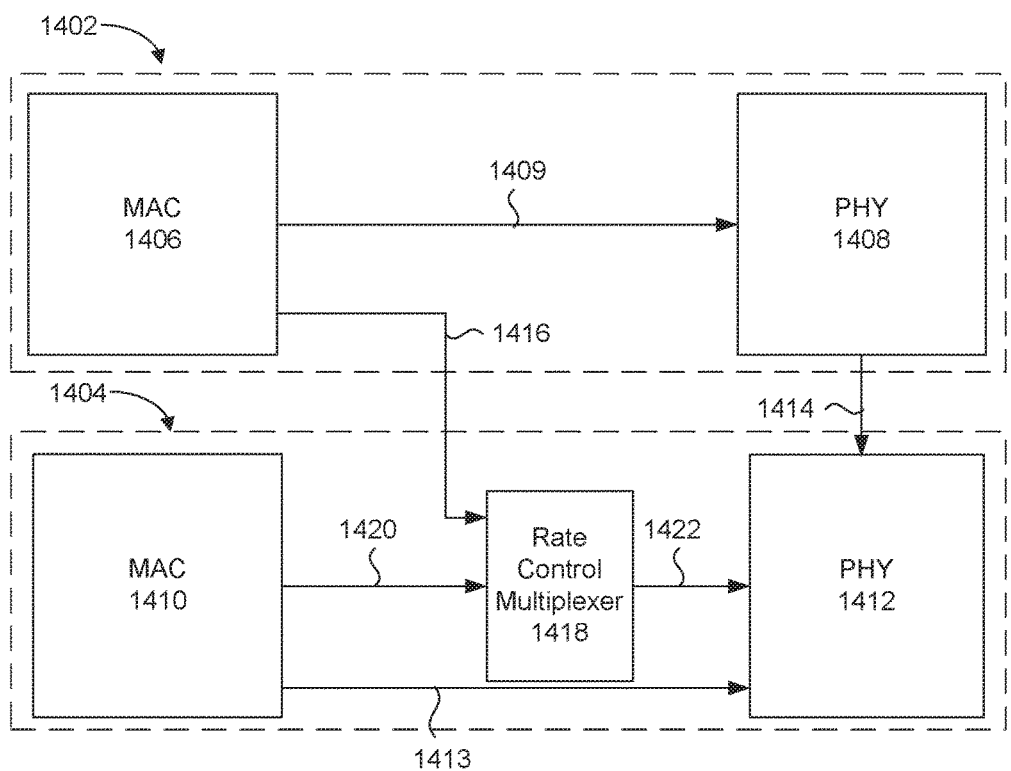
FIG. 14 is a schematic representation illustrating speed negotiation between an active MAC layer instance and an inactive PHY layer instance, in accordance with an aspect of the present disclosure.

Referring now to FIG. 14, an example of a first PCIe interface instance 1402 and a second PCIe interface instance 1404 that are configured to perform negotiation during port mirroring is shown. The first PCIe interface instance 1402 includes a MAC layer instance 1406, a PHY layer instance 1408, and PIPE ports 1409 for carrying PIPE_Tx and PIPE_Rx data between the MAC layer instance 1406 and the PHY layer instance 1408. Similarly, the second PCIe interface instance 1404 also includes a MAC layer instance 1410, a PHY layer instance 1412, and PIPE ports 1413 for sending and receiving PIPE_Tx and PIPE_Rx data between the MAC layer instance 1410 and the PHY layer instance 1412. The MAC layer instances 1404, 1410, the PHY layer instances 1408, 1412, and the PIPE ports may be substantially similar to the MAC layer instances 904*a-d*, the PHY layer instances 906*a-d*, and the PIPE ports 910*a-d* described previously with reference to FIGS. 9 and 10.

In the example shown in FIG. 14, the PHY layer instance 1408 of the first PCIe interface instance 1402 is active and sends PIPE_Tx data or PIPE_Rx data to the PHY layer instance 1412 of the second PCIe interface instance 1404 through the port mirror connection 1414. Because the data sent by the active PHY layer instance 1408 is to be mirrored on the inactive PHY layer instance 1412, the two instances 1408, 1412 have to be configured to run at the same frequency, i.e., both the instances 1408, 1412 configured to support the same PCIe generation protocol.

Therefore, to facilitate mirroring data from the active PHY layer instance 1408 at the inactive PHY layer instance 1412, the MAC layer instance 1406 of the first PCIe interface instance 1402 may send a rate control signals 1416 to the inactive PHY layer instance 1412. The rate control signals 1416 include information regarding the frequency at which the inactive PHY layer instance 1412 is to operate such that the inactive PHY layer instance 1412 may utilize the rate control signal 1416 to operate at the same frequency as the active PHY layer instance 1408.

The rate control signals 1416 may also include analog settings for the inactive PHY layer instance 1412. The analog settings may include, for example, include the decibel (dB) gain information utilized to generate the optional Tx+, Tx−, Rx+, and Rx− signals (not shown) for pre-emphasis and de-emphasis of these signals, as the dB gain varies from one PCIe generation protocol to another.

The rate control signals 1416 may be provided to a rate control multiplexer 1418 of the second PCIe interface instance 1404. The rate control multiplexer 1418 may also receive rate control signals 1420 from the MAC layer instance 1410 of the second PCIe interface instance 1404. Thus, when the PHY layer instance 1412 is to be used for mirroring the port data of the PHY layer instance 1408 of the first PCIe interface instance 1402, the rate control multiplexer 1418 selects the rate control signals 1416 from the MAC layer instance 1406 for output 1422 to the PHY layer instance 1412, thereby enabling the frequency of the PHY layer instance 1412 to be same as that of the PHY layer instance 1408 being mirrored. When the PHY layer instance 1412 is not to be used for mirroring the port data of the PHY layer instance 1408 because, for example, the PHY layer instance is actively receiving and transmitting data with the MAC layer instance 1410, then the rate control multiplexer selects the rate control signals 1420 from the MAC layer instance 1410 for output 1422, so that PHY interface layer 1412 operates at the same frequency as that of the MAC interface layer 1410.

Figure 15:
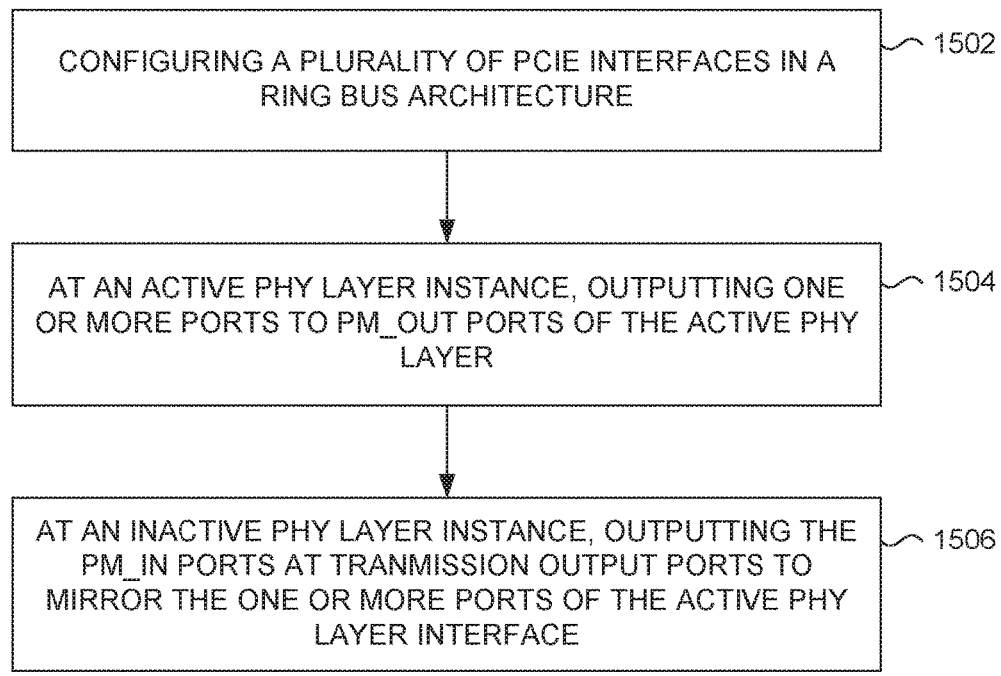
FIG. 15 is a flow chart of a method for port mirroring in a plurality of PCIe interfaces, in accordance with an aspect of the present disclosure.

Referring now to FIG. 15, a flow chart of a method for port mirroring in a plurality of PCIe interfaces is shown. The method may be performed utilizing any of the example plurality of PCIe interfaces described above. At 1502, a plurality of PCIe interfaces are configured in a ring bus architecture. As described above, the plurality of ring bus architectures may be configured in a ring bus architecture by coupling PM_IN ports of each of the PHY layer instances included in the plurality of PCIe interfaces to the PM_OUT ports of the next PHY layer instance such that all of the PHY layer instances are connected in a ring.

At 1504, an active PHY layer outputs one or more ports to the PM_OUT ports. Outputting one or more ports may be performed utilizing the port mirror multiplexer 1300 described above with reference to FIG. 13 in order to output one or more of PIPE_Tx ports and the PIPE_Rx ports to the PM_OUT ports. Outputting one or more ports may include outputting at a first portion of the PM_OUT ports a first set of one or more ports of one of the PIPE_Tx ports, the PIPE_Rx ports, and the PM_IN ports, and outputting at a second portion of the PM_OUT ports a second set of one or more ports of a different one of the PIPE_Tx ports, the PIPE_Rx ports, and the PM_IN ports, as described above. The data carried on the ports out to the PM_OUT may include debugging information received from the active PHY layer from a CPU connected to the active PHY layer.

At 1506, an inactive PHY layer instance outputs the PM_IN ports of the inactive PHY layer instance to the output transmission ports to mirror the one or more ports output to the PM_OUT port of the active layer. The output of the output transmission ports of the inactive layer may be sent to an analyzer for analysis of the data at the one or more ports of the active PHY layer instance. As described above with reference to FIGS. 10 to 12, outputting the PM_IN ports may include utilizing the transmission multiplexer, as well as a transmission FIFO buffer. As described above with reference to FIG. 14, outputting the PM_IN ports may include receiving at the inactive PHY layer rate control signals from the active PHY layer instance and configuring the rate of the inactive PHY layer instance based on the rate control signal. Further, the rate control signal may include analog settings of the active PHY layer instance and outputting the PM_IN ports of the inactive PHY layer may include configuring the analog settings of the PHY layer instance based on the analog settings received in the rate control signal.

The aspects of the present disclosure provide port mirroring in PCIe interface instances having multiple ports. The disclosed PCIe interface instances support different levels of bifurcations of ports for port mirroring. Further, the port mirroring can be provided for active ports having clocking modes that differ from the clocking modes of the inactive ports utilized for port mirroring.

The present subject matter also enables simultaneous mirroring of multiple ports of different cores. The simultaneously mirrored ports can be Tx and Rx ports.

Further, the present subject matter also provides for speed negotiation between ports for enabling port mirroring.

The invention claimed is:

1. An apparatus for port mirroring comprising:
 a plurality of peripheral component interconnect express (PCIe) interfaces, each PCIe interface comprising, in a physical (PHY) layer instance of the PCIe interface,
  at least one output transmission port connected to a central processing unit (CPU) when the PHY layer instance is active for transmitting data to the CPU and connectable to an analyzer when the PHY layer instance is inactive for analyzing data at the at least one output transmission port,
  at least one receiving input port connected to the CPU for receiving data from the CPU,
  at least one port-mirror-in (PM_IN) port, and
  at least one port-mirror-out (PM_OUT) port;
 wherein the at least one PM_OUT port of each PHY layer instance is coupled to the at least one PM_IN port of a next PHY layer instance such that the PHY layer instances of the plurality of PCIe interfaces are connected in a ring bus architecture such that data from one or more ports of either the at least one output transmission port or the at least one receiving input port of an active PHY layer instance of an active one of the plurality of PCIe interfaces is transmitted, via the at least one PM_OUT port of the active PHY layer instance, to the at least one PM_IN port of an inactive PHY layer instance of an inactive one of the plurality of the PCIe interfaces and transmitted to the analyzer by the output transmission ports of an inactive PHY layer instance connected to the analyzer to mirror the one or more ports of the active PHY layer instance.

2. The apparatus according to claim 1, wherein each PHY layer instance further comprises:
 a transmission multiplexer having a first input connected to the at least one PM_IN port of the PHY layer instance, a second input connected to PCIe architecture (PIPE) transmission ports that receive data from a MAC layer instance associated with the PHY layer instance, and an output connected to the at least one transmission output port of the PHY layer instance;

wherein the transmission multiplexer is configured to connect the at least one transmission output port to the first input in a port mirror mode and to the second input in an active mode.

3. The apparatus according to claim 2, wherein each PHY layer instance further comprises:

an elastic buffer between the at least one PM_IN port and the first input of the input multiplexer for performing clock compensation in the mirror mode when the active PHY layer instance and the inactive PHY layer instance each include a separate clock generator.

4. An apparatus according to claim 1, wherein the at least one output transmission port of the inactive PHY layer interface includes a plurality of output transmission ports, and include:

a first portion of the output transmission ports that mirrors one or more ports of a first active PHY layer instance; and a second portion of the output transmission ports that mirrors one or more ports of a second active PHY layer instance that is different from the first active PHY layer instance.

5. An apparatus according to claim 1, wherein each of the PHY layer instances is configured such that debugging information received from the CPU at the at least one input receive port is output at the at least one PM_OUT port such that the debugging information of the active PHY instance is mirrored at the inactive PHY instance.

6. An apparatus according to claim 1, wherein a speed rate of the inactive PHY layer instance is determined based on a speed rate of the active PHY layer instance.

7. An apparatus according to claim 6, wherein analog settings of the inactive PHY layer instance are determined based on the analog settings of the active PHY instance.

8. An apparatus according to claim 1 further comprising a switch core matrix connected to each of the plurality of PCIe interfaces to route data between MAC layer instances of the plurality of PCIe interfaces, the switch core matrix separate from the in the ring bus architecture connecting the plurality of PHY layer instances.

9. An apparatus for port mirroring comprising:

a plurality of peripheral component interconnect express (PCIe) interfaces, each PCIe interface comprising, in a physical (PHY) layer instance of the PCIe interface, output transmission ports for transmitting data to a central processing unit (CPU), receiving input ports for receiving data from the CPU, port-mirror-in (PM_IN) ports, and port-mirror-out (PM_OUT) ports;

wherein the PM_OUT ports of each PHY layer instance is coupled to the PM_IN ports of a next PHY layer instance such that the PHY layer instances of the plurality of PCIe interfaces are connected in a ring bus architecture for mirroring one or more ports of either the output transmission ports or the receiving input ports of a first active PHY layer instance to output transmission ports of a second inactive PHY layer instance, wherein each PHY layer instance further comprises:

a port mirror multiplexer having first input ports connected to PCIe architecture (PIPE) transmission ports that receive data from a MAC layer instance associated with the PHY layer instance, second input ports connected to the receiving input ports, third input ports connected to the PM_IN ports, and output ports connected to the PM_OUT ports of the PHY layer instance;

wherein the port mirror multiplexer is configured to connect the output ports to one or more of the first input ports and the second input ports in a port mirror mode, and to connect the output ports to the third input ports in an inactive mode.

10. The apparatus according to claim 9, wherein the port mirror multiplexer is configured such that:

a first portion of the output ports correspond to a first set of ports of one of the first input ports, the second input ports and the third input ports; and a second portion of the output ports corresponding to a second set of ports of a different one of the first input ports, the second input ports and the third input ports.

11. The apparatus according to claim 10, wherein the port mirror multiplexer further comprises:

a set of first multiplexer instances, each first multiplexer instance having input ports connected to the PM_IN ports and having a first output port for outputting one of the PM_IN ports;

a set of second multiplexer instances, each second multiplexer instance having input ports connected to PCIe architecture (PIPE) transmission ports and having a second output port for outputting one of the PIPE transmission ports;

a set of third multiplexer instances, each third multiplexer instance having input ports connected to the receiving input ports and having a third output port for outputting one of the receiving input ports; and a set of fourth multiplexer instances, each fourth multiplexer instance having input ports coupled to the first outlet port of a corresponding one of the first multiplexer instances, the second outlet port of a corresponding one of the second multiplexer instances, and the third outlet port of a corresponding one of the third multiplexer instances and having a fourth outlet port corresponding to a respective one or more PM_OUT ports, wherein the first portion of the outlet ports of the port mirror multiplexer corresponds to a first set of the fourth multiplexer instances and the second portion of outlet ports of the port mirror multiplexer corresponds to a second set of the fourth multiplexer instances.

12. A method for port mirroring in a plurality of peripheral component interconnect express (PCIe) interfaces, the method comprising:

configuring each PCIe interface such that each PCIe interface comprises, in a physical (PHY) layer instance of the PCIe interface, at least one output transmission port connected to a central processing unit (CPU) when the PHY layer instance is active for transmitting data to the CPU and connectable to an analyzer when the PHY layer instance is inactive for analyzing data at the at least one output transmission port, and at least one receiving input port connected to the CPU for receiving data from the CPU;

configuring the plurality of PCIe interfaces in a ring bus architecture by coupling at least one port-mirror-in (PM_IN) port of a PHY layer instance of each of the PCIe interfaces to at least one port-mirror-out (PM_OUT) port of a next PHY layer instance;

at an active PHY layer instance of an active one of the plurality of PCIe interfaces, outputting one or more ports of either the at least one output transmission port of the active PHY layer instance and the at least one receiving input port of the active PHY layer instance to the at least one PM_OUT port of the active PHY layer instance;

at an inactive PHY layer instance at an inactive one of the plurality of PCIe interfaces, receiving the output from the at least one PM_OUT port of the active PHY layer instance at the at least one PM_IN port of the inactive PHY layer instance and outputting the received output from the at least one PM_OUT ports of the active PHY layer instance at the at least one output transmission port connected to the analyzer to mirror the one or more ports of the active PHY layer instance.

13. The method according to claim 12, wherein configuring each PCIe interface comprises configuring each PCIe interface such that each PCIe interface comprises, in the PHY layer instance a transmission multiplexer having a first input connected to the at least one PM_IN port, a second input connected to PCIe architecture (PIPE) transmission ports for receiving data from a MAC layer instance associated with the PHY layer instance, and an output connected to the at least one output transmission port of the PHY layer instance, the method further comprising:

switching the input multiplexer to connect the at least one output transmission port to the first input in a port mirror mode and to connect the at least one output transmission port to the second input in an active mode.

14. The method according to claim 13, further comprising, when the PHY layer instance is in a port mirror mode, performing clock compensation between the at least one PM_IN port and the first input of the transmission multiplexer when the active PHY layer instance and the inactive PHY layer instance each include a separate clock generator.

15. The method according to claim 12, wherein configuring each PCIe interface comprises configuring each PCIe interface such that each PCIe interface comprises, in the PHY layer instance a port mirror multiplexer having first input ports connected to PCIe architecture (PIPE) transmission ports that receive data from a MAC layer instance associated with the PHY layer instance, second input ports connected to the at least one receiving input port for receiving data from a central processing unit (CPU), third input ports connected to the at least one PM_IN port, and output ports connected to the at least one PM_OUT port of the PHY layer instance, the method further comprising:

switching the port mirror multiplexer to connect the output ports to one or more of the first input ports and the second input ports in a port mirror mode, and the third input ports in an inactive mode.

16. The method according to claim 15, wherein switching the port mirror multiplexer comprises switching the port mirror multiplexer such that:

a first portion of the output ports corresponds to a first set of ports of one of the first input ports, the second input ports and the third input ports; and a second portion of the output ports corresponds to a second set of ports of a different one of the first input ports, the second input ports, and the third input ports.

17. The method according to claim 16, wherein configuring each PCIe interface comprises configuring each PCIe interface such that the port mirror multiplexer further comprises:

a set of first multiplexer instances, each first multiplexer instance having at least one input port connected to the at least one PM_IN port and having a first output port for outputting one of the at least one PM_IN port;

a set of second multiplexer instances, each second multiplexer instance having input ports connected to the PIPE transmission ports and having a second output port for outputting one of the PIPE transmission ports;

a set of third multiplexer instances, each third multiplexer instance having at least one input port connected to the at least one receiving input port and having a third output port for outputting one of the at least one receiving input ports;

a set of fourth multiplexer instances, each fourth multiplexer instance having input ports coupled to the first outlet port of a corresponding one of the first multiplexer instances, the second outlet port of a corresponding one of the second multiplexer instances, and the third outlet of a corresponding one of the third multiplexer instances and having a fourth outlet corresponding to a respective one or more PM_OUT ports;

wherein switching the port mirror multiplexer comprises utilizing the fourth outlet ports of a first set of the fourth multiplexer instances as the first portion of the output ports of the port mirror multiplexer, and utilizing the fourth outlet ports of a second set of the fourth multiplexer instances as the second portion of the outlet ports of the port mirror multiplexer.

18. A method according to claim 12, wherein configuring each PCIe interface comprises configuring each PCIe interface such that each PCIe interface comprises, in the PHY layer instance, the at least one output transmission port utilized to mirror the one or more ports of the active PHY layer instance comprises a plurality of output transmission ports, the method further comprising configuring the output transmission ports of the inactive PHY layer to include:

a first portion of the output transmission ports that mirror one or more ports of a first active PHY layer instance; and a second portion of the output transmission ports that mirror one or more ports of a second active PHY layer instance that is different from the first active PHY layer instance.

19. A method according to claim 12, further comprising configuring each of the PHY layer instances to transmit debugging information received from the CPU at the at least one PM_OUT port such that the debugging information of the active PHY instance may be mirrored at the inactive PHY instance.

20. The method according to claim 12, further comprising determining a speed rate of the inactive PHY layer instance based on a speed rate of the active PHY layer instance.

21. The method according to claim 12, further comprising determining analog settings of the PHY layer instance of the inactive PHY layer instance are based on analog settings of the active PHY layer instance.

22. The method according to claim 12, wherein configuring the plurality PCIe interfaces in a ring bus architecture comprises connecting the at least one PM_OUT port of the PHY layer instance to the at least one PM_IN port of the next PHY layer instance separate from a switching core matrix that connects to each of the plurality of PCIe interfaces to route data between MAC layer instances of the plurality of PCIe interfaces.

* * * * *